(12) United States Patent
Kasmir et al.

(10) Patent No.: US 10,062,251 B2
(45) Date of Patent: Aug. 28, 2018

(54) DOORBELL BATTERY SYSTEMS

(71) Applicant: SkyBell Technologies, Inc., Irvine, CA (US)

(72) Inventors: Seton Paul Kasmir, San Diego, CA (US); Joseph Frank Scalisi, Yorba Linda, CA (US)

(73) Assignee: SkyBell Technologies, Inc., Irvine, CA (US)

( * ) Notice: Subject to any disclaimer, the term of this patent is extended or adjusted under 35 U.S.C. 154(b) by 0 days.

(21) Appl. No.: 14/728,975

(22) Filed: Jun. 2, 2015

(65) Prior Publication Data

US 2016/0300476 A1 Oct. 13, 2016

Related U.S. Application Data

(63) Continuation-in-part of application No. 14/685,544, filed on Apr. 13, 2015, and a continuation-in-part of application No. 14/726,517, filed on May 30, 2015.

(51) Int. Cl.
| | | |
|---|---|---|
| G08B 1/08 | (2006.01) | |
| G08B 13/14 | (2006.01) | |
| H04M 1/02 | (2006.01) | |
| H04M 11/02 | (2006.01) | |
| H04N 7/18 | (2006.01) | |
| G08B 13/196 | (2006.01) | |
| H04M 1/725 | (2006.01) | |

(52) U.S. Cl.
CPC ...... *G08B 13/1418* (2013.01); *H04M 1/0291* (2013.01); *H04M 11/025* (2013.01); *H04N 7/186* (2013.01); *G08B 13/19684* (2013.01); *H04M 1/7253* (2013.01); *H04M 1/72533* (2013.01)

(58) Field of Classification Search
CPC ............... H04N 7/186; G08B 13/1418; G08B 13/19684; H04M 1/0291; H04M 1/7253; H04M 1/72533
USPC ...................... 340/539.17, 328, 392.1, 393.3
See application file for complete search history.

(56) References Cited

U.S. PATENT DOCUMENTS

| | | | | |
|---|---|---|---|---|
| 5,210,520 | A * | 5/1993 | Housley | 340/326 |
| 5,428,388 | A * | 6/1995 | von Bauer et al. | 348/155 |
| 5,521,578 | A * | 5/1996 | DelValle | G08B 5/36 340/286.01 |
| 5,907,352 | A * | 5/1999 | Gilley | 348/151 |
| 7,015,943 | B2 * | 3/2006 | Chiang | 348/143 |
| 7,375,492 | B2 * | 5/2008 | Calhoon et al. | 320/108 |
| 7,477,134 | B2 * | 1/2009 | Langer | G08B 3/10 340/326 |
| 7,701,171 | B2 * | 4/2010 | Defant et al. | 320/114 |
| 7,956,576 | B2 * | 6/2011 | Neu et al. | 320/114 |
| 8,354,914 | B2 * | 1/2013 | Buckingham | E05B 47/00 340/5.6 |
| 8,947,530 | B1 * | 2/2015 | Scalisi | 348/143 |

(Continued)

*Primary Examiner* — Adnan Aziz

(57) ABSTRACT

Doorbell systems can communicate wirelessly with remotely located computing devices such as smartphones, laptops, gaming consoles, and streaming media players. In some embodiments, doorbells comprise a camera, a speaker, and a first battery. In several embodiments, a battery pack comprises a second battery and is electrically coupled to the doorbell. A battery charging system can electrically couple the second battery to the first battery such that the second battery is configured to recharge the first battery.

24 Claims, 18 Drawing Sheets

(56) References Cited

U.S. PATENT DOCUMENTS

| | | | |
|---|---|---|---|
| 2004/0095254 A1* | 5/2004 | Maruszczak | G08B 3/10 340/692 |
| 2005/0006528 A1* | 1/2005 | Movsesian | B64C 1/1469 244/129.5 |
| 2005/0071879 A1* | 3/2005 | Haldavnekar et al. | 725/81 |
| 2005/0116480 A1* | 6/2005 | Deng | G07C 9/00563 292/289 |
| 2007/0146115 A1* | 6/2007 | Roosli et al. | 340/5.6 |
| 2008/0297339 A1* | 12/2008 | Mathews | H04L 12/10 340/538.16 |
| 2009/0308116 A1* | 12/2009 | Lambrou | E05B 47/02 70/277 |
| 2010/0134072 A1* | 6/2010 | Neu et al. | 320/137 |
| 2010/0245060 A1* | 9/2010 | Tylicki | G08B 3/10 340/393.3 |
| 2011/0140845 A1* | 6/2011 | Sanders | G08B 15/004 340/6.1 |
| 2012/0044050 A1* | 2/2012 | Vig et al. | 340/5.82 |
| 2012/0267962 A1* | 10/2012 | Hanchett, Jr. | E05B 17/22 307/104 |
| 2013/0020875 A1* | 1/2013 | Wozniak et al. | 307/72 |
| 2013/0057695 A1* | 3/2013 | Huisking | 348/156 |
| 2013/0328522 A1* | 12/2013 | Brockman | G01R 31/3606 320/107 |
| 2014/0167676 A1* | 6/2014 | Mack | 320/101 |
| 2014/0266669 A1* | 9/2014 | Fadell | G05B 19/042 340/501 |
| 2015/0022618 A1* | 1/2015 | Siminoff | 348/14.02 |
| 2015/0027178 A1* | 1/2015 | Scalisi | E05B 47/0001 70/277 |
| 2015/0061859 A1* | 3/2015 | Matsuoka | G08B 27/00 340/501 |
| 2015/0194839 A1* | 7/2015 | Wojcik et al. | 320/108 |
| 2015/0339895 A1* | 11/2015 | Chen | G08B 3/10 340/393.3 |
| 2016/0001719 A1* | 1/2016 | Frost | B60L 11/1868 307/10.1 |

* cited by examiner

DOORBELL BATTERY SYSTEMS

CROSS-REFERENCE TO RELATED APPLICATIONS

The entire contents of the following application are incorporated by reference herein: U.S. Nonprovisional patent application Ser. No. 14/685,544; filed Apr. 13, 2015; and entitled DOORBELL ANTENNA.

The entire contents of the following application are incorporated by reference herein: U.S. Nonprovisional patent application Ser. No. 14/543,812; filed Nov. 17, 2014; and entitled DOORBELL SECURITY AND SAFETY.

The entire contents of the following application are incorporated by reference herein: U.S. Nonprovisional patent application Ser. No. 14/726,517; filed May 30, 2015; and entitled DOORBELL COMMUNICATION SYSTEMS AND METHODS.

The entire contents of the following application are incorporated by reference herein: U.S. Nonprovisional patent application Ser. No. 14/612,376; filed Feb. 3, 2015; and entitled DOORBELL COMMUNICATION SYSTEMS AND METHODS.

The entire contents of the following application are incorporated by reference herein: U.S. Nonprovisional patent application Ser. No. 14/589,830; filed Jan. 5, 2015; and entitled DOORBELL COMMUNICATION SYSTEMS AND METHODS.

The entire contents of the following applications are incorporated by reference herein: U.S. Nonprovisional patent application Ser. No. 14/502,601; filed Sep. 30, 2014; and entitled DOORBELL COMMUNICATION SYSTEMS AND METHODS; U.S. Nonprovisional patent application Ser. No. 14/492,809; filed Sep. 22, 2014; and entitled DOORBELL COMMUNICATION SYSTEMS AND METHODS; U.S. Nonprovisional patent application Ser. No. 14/275,811; filed May 12, 2014; and entitled DOORBELL COMMUNICATION SYSTEMS AND METHODS; U.S. Nonprovisional patent application Ser. No. 14/142,839; filed Dec. 28, 2013; and entitled DOORBELL COMMUNICATION SYSTEMS AND METHODS; U.S. Nonprovisional patent application Ser. No. 14/099,888; filed Dec. 6, 2013; and entitled DOORBELL COMMUNICATION SYSTEMS AND METHODS; and U.S. Nonprovisional patent application Ser. No. 14/098,772; filed Dec. 6, 2013; and entitled DOORBELL COMMUNICATION SYSTEMS AND METHODS.

The entire contents of the following application are incorporated by reference herein: International Application No. PCT/US14/47622; filed Jul. 22, 2014 with the U.S. Patent and Trademark Office; and entitled DOORBELL COMMUNICATION SYSTEMS AND METHODS.

The entire contents of the following application are incorporated by reference herein: International Application No. PCT/US14/53506; filed Aug. 29, 2014 with the U.S. Patent and Trademark Office; and entitled DOORBELL COMMUNICATION SYSTEMS AND METHODS.

BACKGROUND

Field

Various embodiments disclosed herein relate to doorbells. Certain embodiments relate to doorbells' wireless communication systems and methods.

Description of Related Art

Doorbells can enable a person located outside an entry point, such as a door, to alert a person inside an entry point that someone outside would like to talk to someone inside. Doorbells sometimes include a button located near a door, such as a front door, side door, or back door of a home, office, dwelling, warehouse, building, or structure. Doorbells are sometimes used near a gate or some other entrance to a partially enclosed area. Pushing the doorbell sometimes causes a chime or other alerting sound to be emitted.

Some doorbells communicate wirelessly with remote computing devices. This wireless communication, however, can sometimes be unreliable. Thus, there is a need to improve the reliability of the wireless communication of doorbells.

SUMMARY

In some embodiments, a doorbell system can be configured to wirelessly communicate with a remotely located computing device. The doorbell system can be configured to be coupled to a wall of a building. The doorbell system can comprise a doorbell, a battery pack, and a battery charging system. The doorbell can comprise a camera, a speaker, a microphone, a wireless communication system, and a first battery. The battery pack can comprise a second battery. The battery pack can be electrically coupled to the doorbell. A battery charging system can electrically couple the second battery to the first battery. The battery charging system can be configured to use the second battery to recharge the first battery.

In several embodiments, the doorbell can be located on an exterior side of the wall, and the battery pack can be located on an interior side of the wall. A first electrical wire can electrically couple the doorbell to the battery pack and can enable the second battery to recharge the first battery.

In some embodiments, the second battery can be electrically coupled to the wireless communication system via the first battery, and the second battery can supply electricity to the wireless communication system through the wall from inside the building. The wireless communication system can send a wireless alert, from outside the building, to the remotely located computing device.

In several embodiments, the doorbell system can further comprise a battery charge monitor. The battery charge monitor can be configured to evaluate a battery charge level of the first battery. The doorbell system can be configured to recharge the first battery from the second battery in response to the battery charge level being below a threshold.

In some embodiments of the doorbell system, the wall can comprise a hole having an exterior end and an interior end. The doorbell can cover the exterior end and the battery pack can cover the interior end. The first electrical wire can pass through at least a portion of the hole.

In some embodiments, the first battery can comprise a first capacity and the second battery can comprise a second capacity. The second capacity can be at least four times greater than the first capacity.

In several embodiments, the battery pack can comprise a chime that can be configured to emit a sound in response to a visitor pressing a button of the doorbell. The chime can comprise a speaker that can be configured to emit the sound. The doorbell can further comprise sound data, and the speaker of the battery pack can be electronically coupled, through the wall, to the doorbell. The speaker can be configured to emit the sound based on the sound data from the doorbell.

In some embodiments, the doorbell system can further comprise a second electrical wire that can electrically couple the battery pack to a power outlet. The doorbell system can be configured to recharge the second battery with electricity from the power outlet.

In several embodiments of the doorbell system, the doorbell can be located on an exterior side of the wall and the battery pack can be located on an interior side of the wall. The doorbell can be inductively coupled to the battery pack to enable the second battery to recharge the first battery.

In some embodiments, the doorbell can comprise a receiver induction coil, and the battery pack can comprise a sender induction coil. The receiver induction coil and the sender induction coil can be configured to enable transmitting electricity from the second battery through the wall to the first battery.

In several embodiments, the doorbell system can further comprise an electrical wire that can electrically couple the battery pack to a power outlet. The doorbell system can be configured to recharge the second battery with electricity from the power outlet.

In some embodiments, the battery pack can comprise a chime that can be configured to emit a sound in response to a visitor pressing a button of the doorbell. The doorbell can comprise sound data. The chime can comprise a speaker and a wireless receiver that can be configured to wirelessly receive the sound data from the doorbell. The speaker of the battery pack can be configured to emit the sound based on the sound data from the doorbell.

In several embodiments, the second battery can be inductively coupled to the wireless communication system via the first battery. The second battery can supply electricity to the wireless communication system through the wall from inside the building while the wireless communication system can send a wireless alert, from outside the building, to the remotely located computing device.

In some embodiments, the doorbell system can comprise a battery charge monitor that can be configured to evaluate a battery charge level of the first battery. The doorbell system can be configured to inductively recharge the first battery from the second battery in response to the battery charge level being below a threshold. The first battery can comprise a first capacity and the second battery can comprise a second capacity. The second capacity can be at least four times greater than the first capacity.

In several embodiments of the doorbell system, the doorbell can comprise a first outer housing and the battery pack can comprise a second outer housing. The second outer housing can be mechanically coupled to the wall, such that at least a majority of the battery pack can be located between the doorbell and the wall. The doorbell can be mechanically coupled to the second outer housing of the battery pack, such that the battery pack can mount the doorbell to the wall. The second battery can be located outside of the doorbell.

In some embodiments, the doorbell system can further comprise electrical connections that electrically couple the doorbell to the battery pack. The battery pack can comprise an electrical port that can be configured to couple with an electrical wire. The electrical wire can be used to recharge the second battery from a power outlet.

In several embodiments, the second battery can be electrically coupled to the wireless communication system via the first battery. The second battery can supply electricity to the wireless communication system while the wireless communication system can send a wireless alert, from outside the building, to the remotely located computing device.

In some embodiments, the doorbell system can comprise a battery charge monitor that can be configured to evaluate a battery charge level of the first battery. The doorbell system can be configured to recharge the first battery from the second battery in response to the battery charge level being below a threshold. The first battery can comprise a first capacity. The second battery can comprise a second capacity. The second capacity can be at least four times greater than the first capacity.

In several embodiments, the battery pack can comprise a chime having a speaker. The chime can be configured to emit a sound in response to a visitor pressing a button of the doorbell.

In some embodiments of the doorbell system, the doorbell can comprise a first outer housing. The battery pack can comprise a second outer housing. The first outer housing and the second outer housing can be mechanically coupled to the wall. The second battery can be located outside of the doorbell. The second battery can be electrically coupled to the wireless communication system via the first battery, such that the second battery can supply electricity to the wireless communication system. This can enable the wireless communication system to send a wireless alert to the remotely located computing device.

In several embodiments, the doorbell can be mechanically coupled to the second outer housing of the battery pack. The doorbell system can further comprise a battery charge monitor. The battery charge monitor can be configured to evaluate a battery charge level of the first battery. The doorbell system can be configured to recharge the first battery from the second battery in response to the battery charge level being below a threshold. The first battery can comprise a first capacity. The second battery can comprise a second capacity. The second capacity can be at least four times greater than the first capacity. The battery pack can comprise a chime. The chime can be configured to emit a sound in response to a visitor pressing a button of the doorbell.

A doorbell can include an antenna to facilitate communicating wirelessly with remote computing devices such as smartphones, laptops, gaming consoles, and streaming media players. The antenna can be located within the outer housing of the doorbell. The outer housing, however, can interfere with the antenna's ability to wirelessly communicate (e.g., by reducing the communication range of the doorbell).

In some embodiments, a doorbell can be configured to wirelessly communicate with a remotely located computing device. The doorbell can comprise an outer housing and a button that can be configured to enable a visitor to sound a chime. The button can be coupled to the outer housing. The doorbell can include an antenna coupled to the outer housing and configurable to enable the doorbell to wirelessly communicate with the remotely located computing device.

In several embodiments, the outer housing can comprise a back side that can be configured to face toward a wall to which the doorbell can be mounted. A portion of the antenna can be located inside a hole in the wall (e.g., a person can push a distal end of the antenna into the hole). The hole of the doorbell can comprise at least one electrical wire that electrically couples the doorbell to an external power supply. The antenna can be configured to run alongside a portion of the electrical wire. (As used herein, "run alongside" is used in a broad sense and does not necessarily mean "run parallel to.") The antenna of the doorbell can exit the back side of the outer housing and can be configured to extend at least one inch into the hole. In several embodiments, the antenna extends at least three inches from the back side of the doorbell to reduce the doorbell's obstructive effect on the antenna's communication.

In some embodiments, the doorbell can comprise a first bracket that can be configured to couple the doorbell to the wall. The antenna can extend into the hole through the first bracket. The first bracket can be located between the hole and the outer housing. The antenna can extend from the outer housing, such that the portion of the antenna can be located on an opposite side of the first bracket relative to the outer housing.

In several embodiments, the doorbell can comprise a second metal bracket coupled to the first bracket. A majority of the doorbell can be located between the second metal bracket and the first bracket. The second metal bracket can be configured to hinder decoupling the doorbell from the wall. The second metal bracket can surround a portion of the doorbell, while the antenna can exit the back side of the outer housing. The antenna can be located, at least partially, inside the hole of the wall. The doorbell can comprise a lock that secures the second metal bracket to the first bracket.

In some embodiments, the outer housing can comprise a metal plate that can be outwardly visible and can reduce a first signal strength of a first wireless communication in a first direction. The antenna can extend from the outer housing in a second direction, away from the metal plate. The doorbell can be capable of wirelessly communicating with the remotely located computing device, without relying on communicating via the first direction.

In some embodiments, the outer housing can comprise a metal case that can be outwardly visible and can, at least partially, surround the doorbell. This metal case can reduce a first signal strength of a first wireless communication in a first direction. The antenna can extend from the outer housing in a second direction away from the metal case. The doorbell can then be capable of wirelessly communication with the remotely located computing device without relying on communicating via the first direction.

In several embodiments, the doorbell antenna can comprise a bendable metal protrusion that can be placed, at least partially, into the hole (e.g., such that a portion of the bendable metal protrusion can be located inside the hole of the wall). The doorbell can be mounted to the wall. The hole can comprise at least one electrical wire that electrically couples the doorbell to an external power supply. The antenna can run alongside a portion of the electrical wire.

In some embodiments, the doorbell can comprise a camera. The antenna can be configured to wirelessly communicate pictures taken by the camera from the doorbell to the remotely located computing device.

In several embodiments, the doorbell can comprise a speaker and a microphone that can be coupled to the outer housing. The speaker can be configured to emit a first sound from the remotely located computing device. The microphone can be configured to record a second sound from the visitor. The antenna can be configured to wirelessly communicate the second sound.

In some embodiments, the doorbell can comprise a wireless communication system that can be configured to send a first alert to the remote computing device in response to the detection of a visitor. The antenna can be electrically coupled to the wireless communication system. The wireless communication system can be located inside the outer housing of the doorbell. The antenna can extend from a back side of the doorbell into a hole of a wall. The doorbell can be coupled to the wall. The antenna can extend into the hole while running alongside an electrical wire that can provide electricity from an external power supply to the doorbell. The chime can comprise a speaker located inside the outer housing or can be located remotely relative to the doorbell.

In several embodiments, the doorbell can comprise a bracket system configured to couple the doorbell to the wall. The bracket system can wrap around at least a portion of the doorbell, such that the bracket system can be configured to secure the doorbell to the wall. The doorbell can further comprise a lock that secures a first portion of the bracket system to a second portion of the bracket system. Unlocking the lock facilitates removing the doorbell from the wall.

In some embodiments, the outer housing of the doorbell can comprise a back side that can be configured to face towards a wall to which the doorbell is mounted. The antenna can exit the back side of the outer housing and can be configured to extend away from the outer housing at least one inch into a hole in the wall. The antenna can run alongside at least one electrical wire. The electrical wire can electrically couple the doorbell to an external power supply. The doorbell can further comprise a lock that secures the outer housing to a bracket. The bracket can be configured to couple the doorbell to the wall.

In several embodiments, a doorbell can be configured to wirelessly communicate with a remotely located computing device. The doorbell can comprise an outer housing, a button, a chime, an antenna, and a metal plate. The button can be configured to enable a visitor to sound a chime. The button can be coupled to the outer housing. The antenna can be coupled to the outer housing and can be configured to enable the doorbell to wirelessly communicate with the remotely located computing device. The metal plate can be outwardly visible. The antenna can extend away from the metal plate.

In some embodiments, the metal plate can reduce a first signal strength of a first wireless communication in a first direction. The antenna can extend from the outer housing in a second direction away from the metal plate. Then, the doorbell can be capable of wirelessly communicating with the remotely located computing device without relying on communicating via the first direction. The doorbell can further comprise a mounting bracket that can couple the doorbell to a wall of a building. The antenna can extend from the outer housing, past the mounting bracket, and into a hole in the wall. The hole can comprise at least one electrical wire that electrically couples the doorbell to an external power supply. The antenna can be configured to run alongside a portion of the electrical wire inside the hole.

Tampering with doorbells can lead to injury and doorbell theft. If the owner of the doorbell attempts to remove the doorbell without first cutting electricity to the doorbell, the owner could be electrocuted. Some embodiments warn the owner via an audible alert if the owner moves the doorbell without first cutting external electricity to the doorbell. This audible alert can warn the owner to stop tampering with the doorbell without first cutting the external electrical power to the doorbell.

In other cases, a thief can attempt to forcibly remove a doorbell from a wall. The doorbell can detect that the doorbell is being moved, and then can emit an alert to deter the theft. The doorbell can also send an alert about the theft to the owner of the doorbell. In some embodiments, the system sends a picture of the thief to the owner to help law enforcement officials catch the thief.

Some embodiments include methods of discouraging tampering with a doorbell of a doorbell system. The doorbell system can comprise the doorbell and a remote computing device, such as a computer, a smartphone, a laptop, a tablet, a desktop, and/or a vehicle with a display screen. Embodiments can include obtaining the doorbell that comprises an outer housing, a movement detection system, a speaker, and a button. The button can be configurable to enable a visitor to sound a chime. The movement detection system can be configured to detect movement of the outer housing of the doorbell. Movement detection systems can include accelerometers, screw-movement detectors, and switches configured to detect if two portions of the doorbell are separating.

Several embodiments include using the movement detection system of the doorbell to detect a first movement of the outer housing; and using the doorbell system to emit a first alert via at least one of the remote computing device, the chime, and the speaker of the doorbell in response to detecting the first movement of the outer housing of the doorbell. The first alert can be a push notification to the remote computing device. The remote computing device can display the first alert on the screen of the remote computing device.

In some embodiments, the first alert comprises a sound. Methods can include connecting the doorbell to an external power supply; and emitting the sound of the first alert from the speaker of the doorbell in response to detecting the first movement and in response to the doorbell being electrically coupled to the external power supply while detecting the first movement of the outer housing. The doorbell can be configured to not emit the sound of the first alert if the doorbell is not electrically coupled to the external power supply when the doorbell detects the first movement of the outer housing.

Some methods include configuring the doorbell to continue to emit the sound of the first alert for at least five seconds after the doorbell is electrically decoupled from the external power supply. The doorbell can comprise a battery. The doorbell can be configured such that the battery provides power to enable the doorbell to continue to emit the sound from the speaker after the doorbell is electrically decoupled from the external power supply.

Several embodiments include detecting a second movement of the outer housing, and then the doorbell system blocking a second alert from being emitted from the speaker of the doorbell. The blocking can be in response to the doorbell not being electrically coupled to the external power supply when the doorbell detected the second movement. The blocking can be in response to the remote computing device receiving a command from a user of the remote computing device while the remote computing device is authorized to adjust at least one setting of the doorbell.

Some methods include simultaneously emitting the first alert from the doorbell, the chime, and the remote computing device after the doorbell is decoupled from the external power supply. This simultaneous emitting can be in response to the doorbell detecting the first movement. The first alert can have different forms and characteristics when emitted by the doorbell, the chime, and the remote computing device.

The doorbell can comprise a camera and a battery. Some embodiments include connecting the doorbell to an external power supply; connecting the doorbell to a wireless local area network; and/or recording a video using the camera of the doorbell in response to detecting the first movement and in response to the doorbell being electrically coupled to the external power supply while detecting the first movement of the outer housing. Embodiments can also include sending at least a portion of the video from the doorbell to the remote computing device via the wireless local area network after the doorbell is decoupled from the external power supply and before the doorbell leaves the wireless local area network; and/or using the battery to provide power to the doorbell to send the portion of the video after the doorbell is decoupled from the external power supply and before the doorbell leaves the wireless local area network.

In some embodiments, the movement detection system of the doorbell can comprise an accelerometer. Some embodiments include configuring the accelerometer of the doorbell such that an average press of the button does not cause the doorbell system to emit the first alert. The average press can be the average force used by visitors to "ring" the doorbell by pressing the button. The average press can be found by having a sample of visitors "ring" the doorbell by pressing the button and then averaging the force used for each "ring" of the doorbell.

Several embodiments include using the accelerometer to detect the first movement of the outer housing of the doorbell; and using the doorbell system to emit the first alert in response to the accelerometer detecting the first movement of the outer housing of the doorbell.

The chime can be configured to emit a first sound in response to the visitor pressing the button. Emitting the first alert can comprise emitting a second sound from the chime. The second sound can be different than the first sound. In some embodiments, the ringtone of the first sound is different than the ringtone of the second sound.

Embodiments can include many different types of alerts. The first alert can comprise sending a notification to the remote computing device and/or emitting a first sound from the speaker of the doorbell. Some embodiments include different types of alerts, such as the alerts described in the material incorporated by reference herein.

In several embodiments, the first alert comprises a sound. Embodiments can include emitting the sound of the first alert from the speaker of the doorbell in response to detecting the first movement of the outer housing of the doorbell and in response to the doorbell being electrically coupled to an external power supply while detecting the first movement of the outer housing. The doorbell can be configured to not emit the sound of the first alert if the doorbell is not electrically coupled to the external power supply when the doorbell detects the first movement of the outer housing. The doorbell system can detect the movement of the outer housing and then can decide to not emit an alert because it does not detect electricity from the external power supply. The doorbell, or another part of the doorbell system, can block the alert in response to the doorbell being electrically uncoupled from the external power supply prior to the doorbell detecting the movement of the outer housing (e.g., movement of the doorbell not including movement of the button configured to sound the chime).

Some embodiments include configuring the doorbell system to emit the first alert in response to detecting the first movement of the outer housing of the doorbell above a predetermined threshold such that the doorbell system is configured to not emit the first alert in response to detecting a second movement of the outer housing that is less than the predetermined threshold. In several embodiments, the predetermined threshold can be an acceleration threshold.

In some embodiments, the doorbell comprises a screw and a mounting bracket configured to be coupled to a building. The mounting bracket can be metal and/or molded plastic. The screw can secure the outer housing to the mounting bracket. The movement detection system can be configured to detect when the screw is moved to uncouple the outer housing from the mounting bracket. For example, moving the screw more than a predetermined amount can cause the screw to lose contact with a switch, which can notify the doorbell that the screw has moved. Embodiments can include using the movement detection system to detect screw movement; and/or emitting the first alert in response to detecting the screw movement and in response to the doorbell being electrically coupled to an external power supply while detecting the first movement. Emitting the first alert can comprise emitting a first sound from the speaker of the doorbell.

In several embodiments, the movement detection system comprises a switch that is covered by the outer housing of the doorbell. The switch can be configured such that removing the doorbell from a building to which the doorbell is coupled triggers the switch. For example, the switch can be configured such that coupling the outer housing to a mounting bracket compresses the switch. Then, removing the outer housing from the mounting bracket can decompress the switch, which can notify the system that the outer housing has been removed from the mounting bracket.

Some embodiments include using the movement detection system to detect a triggering of the switch caused by removing the doorbell from the building; and/or emitting the first alert in response to detecting the triggering of the switch and in response to the doorbell being electrically coupled to an external power supply while detecting the triggering of the switch. Emitting the first alert can comprise sending a notification from the doorbell to the remote computing device.

Several embodiments discourage tampering with a doorbell. A doorbell system can comprise the doorbell and a remote computing device. Embodiments can include obtaining the doorbell that comprises an outer housing, a movement detection system, a speaker, and a button configurable to enable a visitor to sound a chime. The movement detection system can be configured to detect movement of the outer housing of the doorbell. Embodiments can include configuring the doorbell to emit a first alert in response to detecting a first movement of the outer housing of the doorbell; and/or using the movement detection system of the doorbell to detect the first movement of the outer housing.

Some embodiments comprise blocking the doorbell from emitting the first alert. The doorbell system can block the doorbell from emitting the first alert in response to detecting that the doorbell is not electrically coupled to an external power supply within five seconds of the doorbell detecting the first movement of the outer housing. (If the doorbell is electrically coupled to an external power supply when the doorbell detects the first movement of the outer housing, then the doorbell is electrically coupled to an external power supply within five seconds of the doorbell detecting the first movement of the housing.)

Some embodiments include the doorbell system blocking the doorbell from emitting the first alert in response to detecting that the doorbell is not electrically coupled to an external power supply within fifteen seconds prior to the doorbell detecting the first movement of the outer housing and/or within one second after the doorbell detects the first movement. Detecting within 15 seconds prior to the doorbell detecting movement can help guard against emitting an alert when a user has recently disconnected the external power. Users typically take at least 15 seconds to walk from the control panel (after tripping the circuit breaker) to the doorbell. Detecting within one second after the doorbell detects the first movement can help guard against failing to emit an alert due to a thief tearing the doorbell away from the building (and thereby cutting the connection to the external power supply). Thieves typically take at least one second from the time they start moving the outer housing to the time they tear the doorbell off the wall.

The doorbell system can detect whether the doorbell is electrically coupled to an external power supply in many different ways. In some embodiments, the doorbell can detect that the doorbell is electrically coupled to an external power supply by having electricity to operate (other than from the battery).

In some embodiments, the movement detection system of the doorbell comprises an accelerometer. Embodiments can include configuring the accelerometer of the doorbell such that an average press of the button does not cause the doorbell to detect the first movement of the outer housing; and/or using the accelerometer to detect the first movement of the outer housing of the doorbell.

Although some embodiments are described in the context of methods, the method embodiments can also be formulated as devices and systems. Methods described herein can be applied to the material (e.g., the devices and systems) incorporated by references herein.

Several embodiments comprise a doorbell configured to discourage tampering. The doorbell can comprise an outer housing and a button configured to enable a visitor to sound a chime. The button can be coupled to the outer housing. Doorbells can also include an accelerometer coupled to the outer housing such that the accelerometer is configured to detect movement of the outer housing of the doorbell. Doorbells can also include a speaker coupled to the outer housing. The speaker can be configured to emit a first alert in response to the accelerometer detecting movement of the outer housing of the doorbell.

Doorbell embodiments can also include a power detection system configured to detect whether the doorbell is electrically coupled to an external power supply. Doorbell embodiments can also include an electronic control system electrically coupled to the speaker such that the speaker emits the first alert in response to the accelerometer detecting the movement of the outer housing of the doorbell and in response to the power detection system detecting the external power supply. The doorbell can decide not to emit the first alert unless the doorbell detects both the movement and the external power.

Embodiments can also include a wireless communication system configured to send a second alert to a remote computing device in response to the accelerometer detecting the movement of the outer housing of the doorbell and in response to the power detection system detecting the external power supply. Doorbells can also include a battery configured to provide power to enable the doorbell to continue to emit the first alert from the speaker after the doorbell is electrically decoupled from the external power supply.

BRIEF DESCRIPTION OF THE DRAWINGS

These and other features, aspects, and advantages are described below with reference to the drawings, which are intended to illustrate, but not to limit, the invention. In the drawings, like reference characters denote corresponding features consistently throughout similar embodiments.

DETAILED DESCRIPTION

Figure 1:
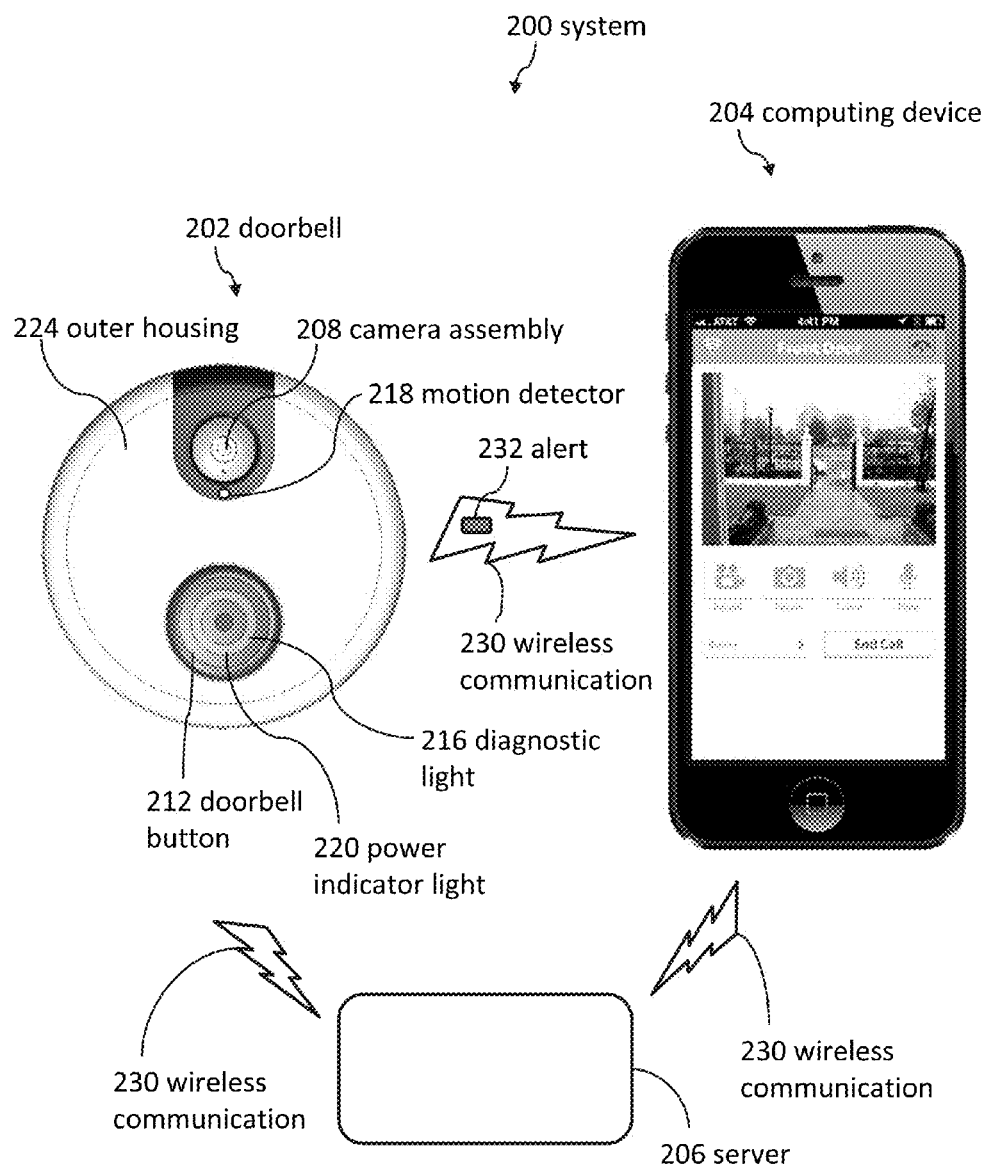
FIG. 1 illustrates a front view of a doorbell system, according to some embodiments.

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Doorbell systems can comprise a switch, which is often mounted outside a building near a door. Pressing a doorbell button can close the switch to close a circuit that includes a chime. Closing the circuit can cause the chime to emit a sound configured to notify people inside the building that someone is "ringing" the doorbell. A transformer can receive electricity from a power supply of the building, and then can convert the electricity such that the electricity is better suited for the circuit and the chime. In some embodiments, the circuit includes the doorbell switch, the chime, and the transformer.

In some embodiments, the doorbell is not electrically coupled to the chime, but is communicatively coupled to the chime (e.g., via a wireless communication). The doorbell can have its own power supply (e.g., a battery) such that the doorbell does not need to receive power from a power supply of a building to which the doorbell is mechanically coupled.

The chime can be mechanical or digital. In some cases, the chime comprises a speaker to emit a notification sound. In several embodiments, the chime includes a mechanical sound output device.

Although some doorbell systems are technically simple, other doorbell systems include advanced electronics, wireless communication systems, cameras, speakers, and/or microphones. Doorbells can communicate with remote computing devices (e.g., to notify remote users that a visitor is present near the doorbell).

Doorbell systems can include a doorbell, a remote computing device, and a means of communication between the doorbell and the remote computing device. The means of communication can include the Internet, a wireless network, and/or a server. In some embodiments, the doorbell communicates with the remote computing device without using a server.

FIG. 1 illustrates a doorbell 202 that can include a camera assembly 208 and a motion detector 218. When a visitor approaches the doorbell 202 (e.g., to ring a doorbell button 212), the doorbell 202 can send a wireless notification to a computing device 204 that is located remotely relative to the doorbell 202. Computing devices 204 can include smartphones, laptops, gaming consoles, streaming media players, and many other types of computing devices.

System Embodiments

Communication systems can provide a secure and convenient way for a remotely located individual to communicate with a person who is approaching a sensor, such as a proximity sensor or motion sensor, or with a person who rings a doorbell, which can be located in a doorway, near an entrance, or within 15 feet of a door. Some communication systems allow an individual to hear, see, and talk with visitors who approach at least a portion of the communication system and/or press a button, such as a doorbell's button. For example, communication systems can use a computing device to enable a remotely located person to see, hear, and/or talk with visitors. Computing devices can include computers, laptops, tablets, mobile devices, smartphones, cellular phones, and wireless devices (e.g., cars with wireless communication). Example computing devices include the iPhone, iPad, iMac, MacBook Air, and MacBook Pro made by Apple Inc. Communication between a remotely located person and a visitor can occur via the Internet, cellular networks, telecommunication networks, and wireless networks.

Referring now to FIG. 1, doorbell systems can be a portion of a smart home hub. In some embodiments, the doorbell system 200 forms the core of the smart home hub. For example, the various systems described herein enable complete home automation. In some embodiments, the doorbell 202 controls various electrical items in a home (e.g., lights, air conditioners, heaters, motion sensors, garage door openers, locks, televisions, computers, entertainment systems, pool monitors, elderly monitors). In some embodiments, the computing device 204 controls the doorbell 202 and other electrical items in a home (e.g., lights, air conditioners, heaters, motion sensors, garage door openers, locks, televisions, computers, entertainment systems, pool monitors, elderly monitors).

FIG. 1 illustrates a front view of a communication system embodiment. The doorbell system 200 can include a doorbell 202 (e.g., a security system) and a computing device 204. Although the illustrated doorbell 202 includes many components in one housing, several doorbell embodiments include components in separate housings. The doorbell 202 can include a camera assembly 208 and a doorbell button 212. The camera assembly 208 can include a video camera, which in some embodiments is a webcam. The doorbell 202 can include a diagnostic light 216 and a power indicator light 220. In some embodiments, the diagnostic light 216 is a first color (e.g., blue) if the doorbell 202 and/or the doorbell system 200 is connected to a wireless Internet network and is a second color (e.g., red) if the doorbell 202 and/or the doorbell system 200 is not connected to a wireless Internet network. In some embodiments, the power indicator 220 is a first color if the doorbell 202 is connected to a power source. The power source can be supplied by the building to which the doorbell 202 is attached. In some embodiments, the power indicator 220 is a second color or does not emit light if the doorbell 202 is not connected to the power source.

The doorbell 202 can include an outer housing 224, which can be water resistant and/or waterproof. The outer housing can be made from metal or plastic, such as molded plastic with a hardness of 60 Shore D. In some embodiments, the outer housing 224 is made from brushed nickel or aluminum.

Rubber seals can be used to make the outer housing 224 water resistant or waterproof. The doorbell 202 can be electrically coupled to a power source, such as wires electrically connected to a building's electrical power system. In some embodiments, the doorbell 202 includes a battery for backup and/or primary power.

Wireless communication 230 can enable the doorbell 202 to communicate with the computing device 204. Some embodiments enable communication via cellular and/or WiFi networks. Some embodiments enable communication via the Internet. Several embodiments enable wired communication between the doorbell 202 and the computing device 204. The wireless communication 230 can include the following communication means: radio, WiFi (e.g., wireless local area network), cellular, Internet, Bluetooth, telecommunication, electromagnetic, infrared, light, sonic, and microwave. Other communication means are used by some embodiments. In some embodiments, such as embodiments that include telecommunication or cellular communication means, the doorbell 202 can initiate voice calls or send text messages to a computing device 204 (e.g., a smartphone, a desktop computer, a tablet computer, a laptop computer).

Several embodiments use near field communication (NFC) to communicate between the computing device 204 and the doorbell 202. The doorbell 202 and/or the computing device 204 can include a NFC tag. Some NFC technologies include Bluetooth, radio-frequency identification, and QR codes.

Some embodiments include computer software (e.g., application software), which can be a mobile application designed to run on smartphones, tablet computers, and other mobile devices. Software of this nature is sometimes referred to as "app" software. Some embodiments include software designed to run on desktop computers and laptop computers.

The computing device 204 can run software with a graphical user interface. The user interface can include icons or buttons. In some embodiments, the software is configured for use with a touch-screen computing device such as a smartphone or tablet.

Figure 2:
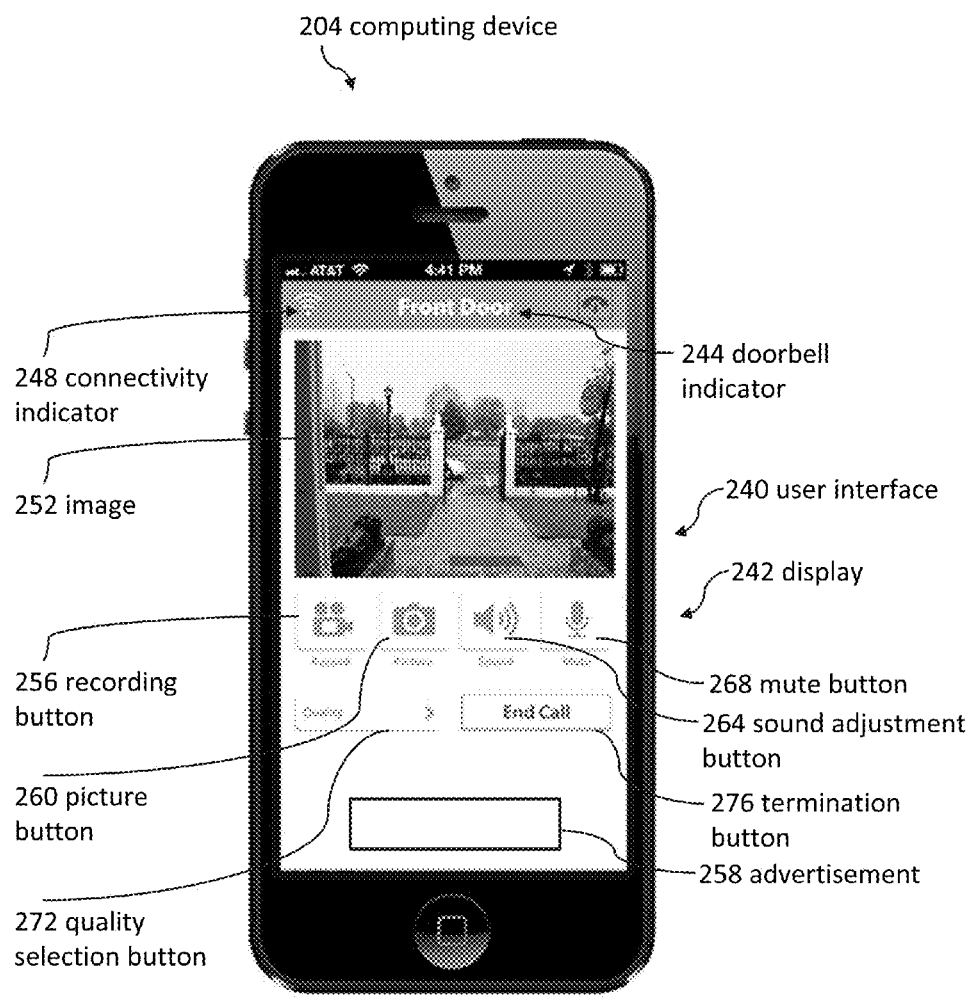
FIG. 2 illustrates a front view of a computing device running software to communicate with the doorbell from FIG. 1, according to some embodiments.

FIG. 2 illustrates a computing device 204 running software. The software includes a user interface 240 displayed on a display screen 242. The user interface 240 can include a doorbell indicator 244, which can indicate the location of the doorbell that the user interface is displaying. For example, a person can use one computing device 204 to control and/or interact with multiple doorbells, such as one doorbell located at a front door and another doorbell located at a back door. Selecting the doorbell indicator 244 can allow the user to choose another doorbell (e.g., the back door's doorbell rather than the front door's doorbell).

The user interface 240 can include a connectivity indicator 248. In some embodiments, the connectivity indicator can indicate whether the computing device is in communication with a doorbell, the Internet, and/or a cellular network. The connectivity indicator 248 can alert the user if the computing device 204 has lost its connection with the doorbell 202; the doorbell 202 has been damaged; the doorbell 202 has been stolen; the doorbell 202 has been removed from its mounting location; the doorbell 202 has lost electrical power; and/or if the computing device 204 cannot communicate with the doorbell 202. In some embodiments, the connectivity indicator 248 alerts the user of the computing device 204 by flashing, emitting a sound, displaying a message, and/or displaying a symbol.

In some embodiments, if the doorbell 202 loses power, loses connectivity to the computing device 204, loses connectivity to the Internet, and/or loses connectivity to a remote server, a remote server 206 sends an alert (e.g., phone call, text message, image on the user interface 240) regarding the power and/or connectivity issue. In several embodiments, the remote server 206 can manage communication between the doorbell 202 and the computing device. In some embodiments, information from the doorbell 202 is stored by the remote server 206. In several embodiments, information from the doorbell 202 is stored by the remote server 206 until the information can be sent to the computing device 204, uploaded to the computing device 204, and/or displayed to the remotely located person via the computing device 204. The remote server 206 can be a computing device that stores information from the doorbell 202 and/or from the computing device 204. In some embodiments, the remote server 206 is located in a data center.

In some embodiments, the computing device 204 and/or the remote server 206 attempts to communicate with the doorbell 202. If the computing device 204 and/or the remote server 206 is unable to communicate with the doorbell 202, the computing device 204 and/or the remote server 206 alerts the remotely located person via the software, phone, text, a displayed message, and/or a website. In some embodiments, the computing device 204 and/or the remote server 206 attempts to communicate with the doorbell 202 periodically; at least every five hours and/or less than every 10 minutes; at least every 24 hours and/or less than every 60 minutes; or at least every hour and/or less than every second.

In some embodiments, the server 206 can initiate communication with the computing device 204 and/or with the doorbell 202. In several embodiments, the server 206 can initiate, control, and/or block communication between the computing device 204 and the doorbell 202.

In several embodiments, a user can log in to an "app," website, and/or software on a computing device (e.g., mobile computing device, smartphone, tablet, desktop computer) to adjust the doorbell settings discussed herein.

In some embodiments, a computing device can enable a user to watch live video and/or hear live audio from a doorbell due to the user's request rather than due to actions of a visitor. Some embodiments include a computing device initiating a live video feed (or a video feed that is less than five minutes old).

In some embodiments, the user interface 240 displays an image 252 such as a still image or a video of an area near and/or in front of the doorbell 202. The image 252 can be taken by the camera assembly 208 and stored by the doorbell 202, server 206, and/or computing device 204. The user interface 240 can include a recording button 256 to enable a user to record images, videos, and/or sound from the camera assembly 208, microphone of the doorbell 202, and/or microphone of the computing device 204.

In several embodiments, the user interface 240 includes a picture button 260 to allow the user to take still pictures and/or videos of the area near and/or in front of the doorbell 202. The user interface 240 can also include a sound adjustment button 264 and a mute button 268. The user interface 240 can include camera manipulation buttons such as zoom, pan, and light adjustment buttons. In some embodiments, the camera assembly 208 automatically adjusts between Day Mode and Night Mode. Some embodiments include an infrared camera and/or infrared lights to illuminate an area near the doorbell 202 to enable the camera assembly 208 to provide sufficient visibility (even at night).

In some embodiments, buttons include diverse means of selecting various options, features, and functions. Buttons can be selected by mouse clicks, keyboard commands, and touching a touch screen. Many embodiments include buttons that can be selected without touch screens.

In some embodiments, the user interface 240 includes a quality selection button, which can allow a user to select the quality and/or amount of the data transmitted from the doorbell 202 to the computing device 204 and/or from the computing device 204 to the doorbell 202.

In some embodiments, video can be sent to and/or received from the computing device 204 using video chat protocols such as FaceTime (by Apple Inc.) or Skype (by Microsoft Corporation). In some embodiments, these videos are played by videoconferencing apps on the computing device 204 instead of being played by the user interface 240.

The user interface 240 can include a termination button 276 to end communication between the doorbell 202 and the computing device 204. In some embodiments, the termination button 276 ends the ability of the person located near the doorbell 202 (i.e., the visitor) to hear and/or see the user of the computing device 204, but does not end the ability of the user of the computing device 204 to hear and/or see the person located near the doorbell 202.

In some embodiments, a button 276 is both an answer button (to accept a communication request from a visitor) and a termination button (to end communication between the doorbell 202 and the computing device 204). The button 276 can include the word "Answer" when the system is attempting to establish two-way communication between the visitor and the user. Selecting the button 276 when the system is attempting to establish two-way communication between the visitor and the user can start two-way communication. The button 276 can include the words "End Call" during two-way communication between the visitor and the user. Selecting the button 276 during two-way communication between the visitor and the user can terminate two-way communication. In some embodiments, terminating two-way communication still enables the user to see and hear the visitor. In some embodiments, terminating two-way communication causes the computing device 204 to stop showing video from the doorbell and to stop emitting sounds recorded by the doorbell.

In some embodiments, the user interface 240 opens as soon as the doorbell detects a visitor (e.g., senses indications of a visitor). Once the user interface 240 opens, the user can see and/or hear the visitor even before "answering" or otherwise accepting two-way communication, in several embodiments.

Some method embodiments include detecting a visitor with a doorbell. The methods can include causing the user interface to display on a remote computing device 204 due to the detection of the visitor (e.g., with or without user interaction). The methods can include displaying video from the doorbell and/or audio from the doorbell before the user accepts two-way communication with the visitor. The methods can include displaying video from the doorbell and/or audio from the doorbell before the user accepts the visitor's communication request. The methods can include the computing device simultaneously asking the user if the user wants to accept (e.g., answer) the communication request and displaying audio and/or video of the visitor. For example, in some embodiments, the user can see and hear the visitor via the doorbell before opening a means of two-way communication with the visitor.

In some embodiments, the software includes means to start the video feed on demand. For example, a user of the computing device might wonder what is happening near the doorbell 202. The user can open the software application on the computing device 204 and instruct the application to show live video and/or audio from the security device 202 even if no event near the doorbell 202 has triggered the communication.

In several embodiments, the security device 202 can be configured to record when the security device 202 detects movement and/or the presence of a person. The user of the computing device 204 can later review all video and/or audio records from when the security device 202 detected movement and/or the presence of a person.

Referring now to FIG. 1, in some embodiments, the server 206 controls communication between the computing device 204 and the doorbell 202, which can be a doorbell with a camera, a microphone, and a speaker. In several embodiments, the server 206 does not control communication between the computing device 204 and the doorbell 202.

In some embodiments, data captured by the doorbell and/or the computing device 204 (such as videos, pictures, and audio) is stored by another remote device such as the server 206. Cloud storage, enterprise storage, and/or networked enterprise storage can be used to store video, pictures, and/or audio from the doorbell system 200 or from any part of the doorbell system 200. The user can download and/or stream stored data and/or storage video, pictures, and/or audio. For example, a user can record visitors for a year and then later can review conversations with visitors from the last year. In some embodiments, remote storage, the server 206, the computing device 204, and/or the doorbell 202 can store information and statistics regarding visitors and usage.

Figure 3:
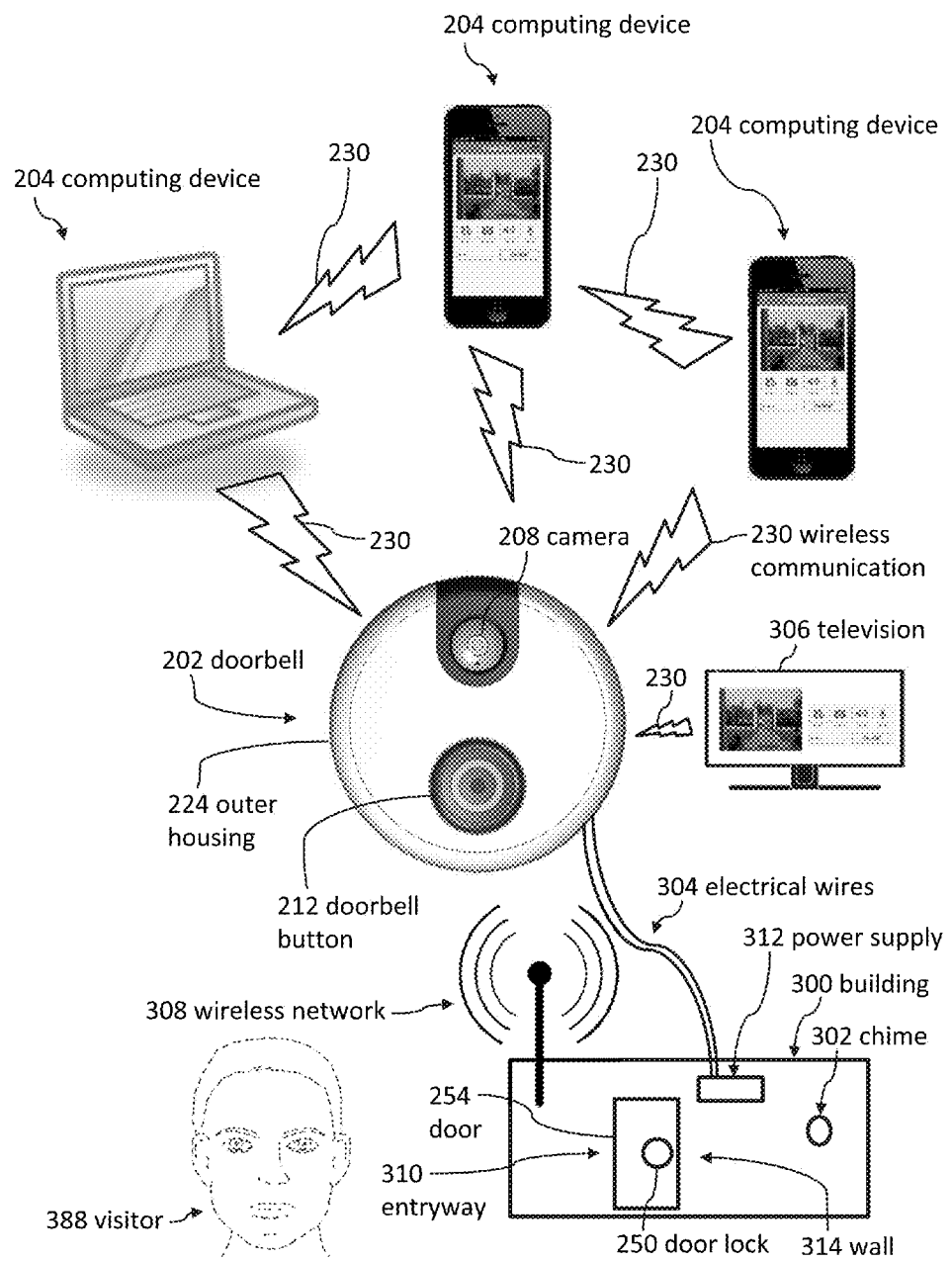
FIG. 3 illustrates a diagrammatic view of an embodiment in which the doorbell from FIG. 1 is connected to a building, according to some embodiments.

FIG. 3 illustrates an embodiment in which a doorbell 202 is connected to a building 300, which can include an entryway 310 that has a door 254. Electrical wires 304 can electrically couple the doorbell 202 to the electrical system of the building 300 such that the doorbell 202 can receive electrical power from the building 300. The building can include a door lock 250 to lock the door 254.

The doorbell 202 can detect a visitor 388 as the visitor approaches the doorbell 202 (e.g., by the visitor pressing the button 212, by image recognition via the camera 208, or by another sensor as described herein).

A wireless network 308 can allow devices to wirelessly access the Internet. The doorbell 202 can access the Internet via the wireless network 308. The wireless network 308 can transmit data from the doorbell 202 to the Internet, which can transmit the data to remotely located computing devices 204. The Internet and wireless networks can transmit data from remotely located computing devices 204 to the doorbell 202. In some embodiments, a doorbell 202 connects to a home's WiFi.

As illustrated in FIG. 3, one computing device 204 (e.g., a laptop, a smartphone, a mobile computing device, a television) can communicate with multiple doorbells 202. In some embodiments, multiple computing devices 204 can communicate with one doorbell 202.

In some embodiments, the doorbell 202 can communicate (e.g., wirelessly 230) with a television 306, which can be a smart television. Users can view the television 306 to see a visitor and/or talk with the visitor.

As used herein, an "electronic device" is capable of displaying images, including videos. An electronic device consumes electrical power and is capable of running software. As used herein, the term "electronic device" should not be confused with the term "electronic key." Many electronic key embodiments are not capable of displaying images, consuming electrical power, or running software.

Tamper Detection Embodiments

Potential thieves have easy access to doorbells mounted outside buildings. Several embodiments include means to deter doorbell theft. In some embodiments, the doorbell and/or the chime emits an "alarm" sound if a thief tries to steal the doorbell. In some embodiments, the doorbell system sends an alert to a remote computing device when a thief tries to steal the doorbell. The alert can include video and/or audio of the thief. The video and audio can help law enforcement officials identify the thief. The video and audio can be recorded in a database for later review by the owner of the doorbell and law enforcement officials.

In many cases, the alarm sound will scare the thief such that the thief stops trying to steal the doorbell. Thus, various embodiments can prevent doorbell theft.

Embodiments include diverse means of identifying when someone is trying to steal a doorbell rather than simply trying to "ring" or otherwise appropriately use the doorbell. As false positives could be bothersome to doorbell owners, some embodiments are tailored to reduce false positives while reliably and accurately identifying when a thief is trying to steal the doorbell.

Removing a doorbell from a wall of a building without first disconnecting the electricity can lead to electrocution. Some embodiments warn people if they try to remove a doorbell from a wall without first shutting off the external power to the doorbell. (The doorbell can still receive power from a battery after the doorbell's connection to external power is terminated.) Owners can shut off external power via a circuit breaker in the building's control panel.

Thieves often do not have access to the control panel. As a result, thieves may attempt to steal the doorbell without first shutting off external power via the control panel. In various embodiments, a doorbell can detect if someone is trying to remove the doorbell without first shutting off the external power (e.g., the electrical power from the building to which the doorbell is attached). Then, the doorbell can emit an alert to the thief, people inside the building, and/or to a user of a remote computing device. The alert can take many forms including a sound emitted by the speaker of the doorbell, a sound from the doorbell chime of the building, and/or a push notification to the remote computing device. Alerts to remote computing devices can include a picture of the person who removed the doorbell.

The sound from the speaker of the doorbell can continue after the thief disconnects the external power by tearing the doorbell from the building, which tears the building's electrical wires from the doorbell. The battery of the doorbell can enable the doorbell to keep emitting the alert sound after the doorbell loses electrical power from the building. The sound from the speaker can be at least 60 decibels, which is loud enough to encourage the thief to not steal the doorbell.

Various aspects and features of the Figures are described more fully in the matter incorporated by reference herein (e.g., in U.S. Nonprovisional patent application Ser. No. 14/502,601, which is incorporated by reference herein).

FIG. 1 illustrates a front view of a doorbell system 200. Some embodiments include methods of discouraging tampering with a doorbell 202 of a doorbell system 200. The doorbell system 200 can comprise the doorbell 202 and a remote computing device 204, such as a computer, a smartphone, a laptop, a tablet, a desktop, and/or a vehicle with a display screen. Embodiments can include obtaining a doorbell 202. The doorbell 202 can include an outer housing 224 and a button 212.

Figure 4:
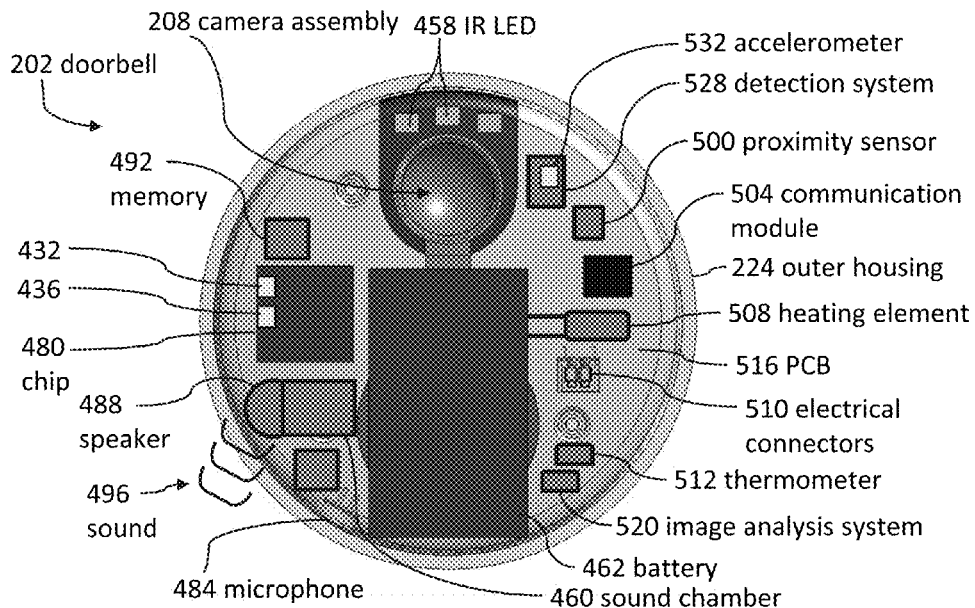
FIG. 4 illustrates a back view of the doorbell from FIG. 1 without a mounting bracket, according to some embodiments.
Figure 5:
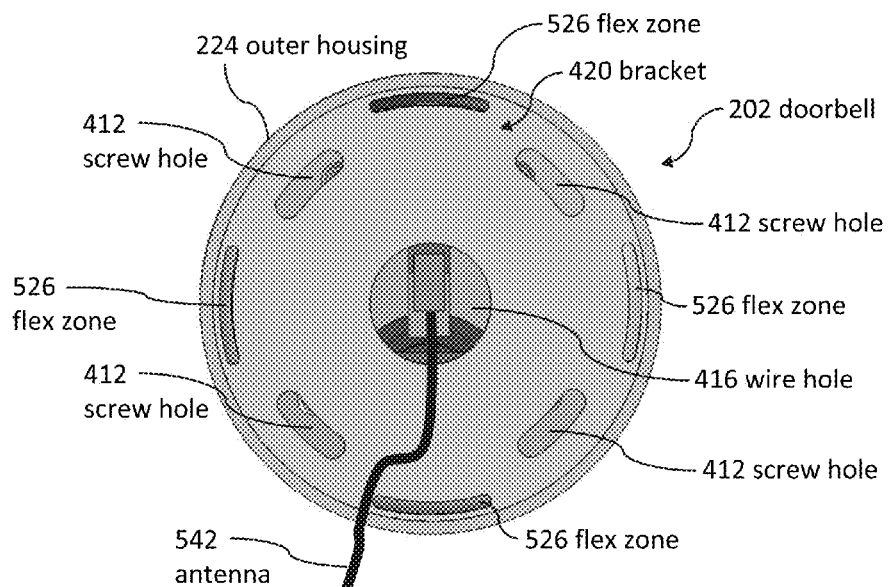
FIG. 5 illustrates a back view of the doorbell from FIG. 1 with a mounting bracket, according to some embodiments.

FIG. 4 illustrates a back view of the doorbell 202 from FIG. 1 without a mounting bracket 420. FIG. 5 illustrates a back view of the doorbell 202 from FIG. 1 with a mounting bracket 420. FIG. 4 shows that the doorbell 202 can include a movement detection system 528 and a speaker 488.

Referring now to FIG. 3, the button 212 can be configurable to enable a visitor to sound a chime 302. The chime 302 can make a "ding-dong" sound in response to a visitor pressing the button 212. The chime 302 can be mechanical or digital. In some embodiments, the chime 302 includes a speaker to emit any type of audible sound (e.g., prerecorded words, songs).

Electrical wires 304 can electrically couple the doorbell 202 to an external power supply 312. The external power supply 312 can be the electrical power of a building 300. The electrical power can be supplied by a utility company or by a generator. An external power supply is a power supply that is located remotely relative to the doorbell 202.

Referring now to FIG. 4, the movement detection system 528 can be configured to detect movement of the outer housing 224 of the doorbell 202. Movement detection systems 528 can include accelerometers, screw-movement detectors, and switches configured to detect if two portions of the doorbell are separating.

The movement detection system 528 illustrated in FIG. 4 can include an accelerometer 532. The accelerometer can be coupled to a printed circuit board ("PCB") 516. The PCB 516 is coupled to the outer housing 224 of the doorbell 202 such that the accelerometer 532 is coupled to the outer housing 224. As a result, the accelerometer 532 is configured to detect movement of the outer housing 224 rather than movement of the doorbell button 212 (shown in FIG. 3).

In many embodiments, the doorbell 202 is configured such that the movement detection system 528 can detect movement of the outer housing 224 while ignoring movement of the button 212. As a result, the system can emit alerts regarding unwanted movement of the doorbell 202 (rather than being falsely triggered by movement of the doorbell button 212). Pushing the doorbell button 212 can cause the system to emit a different alert that is configured to notify people that a visitor has "rung" the doorbell (rather than to notify people that someone is tampering with the doorbell).

Several embodiments include using the movement detection system 528 of the doorbell 202 to detect a first movement of the outer housing; and using the doorbell system 200 to emit a first alert 232 via at least one of the remote computing device 204 (shown in FIG. 1), the chime 302 (shown in FIG. 3), and the speaker 488 of the doorbell 202 in response to detecting the first movement of the outer housing of the doorbell. The first alert 232 can be a push notification to the remote computing device 204 (shown in FIG. 1).

Referring now to FIG. 2, the remote computing device 204 can show the first alert (e.g., an image 252) on the display 242 of the remote computing device 204. The first alert can be a push notification that is shown on the display 242 and/or can include text that is shown on the display 242. The remote computing device 204 can run software configured to display images 252 taken by the camera assembly 208 (shown in FIG. 1) of the doorbell 202.

In some embodiments, the first alert comprises a sound. Methods can include connecting the doorbell to an external power supply; and emitting the sound of the first alert from the speaker of the doorbell in response to detecting the first movement and in response to the doorbell being electrically coupled to the external power supply while detecting the first movement of the outer housing. The doorbell can be configured to not emit the sound of the first alert if the doorbell is not electrically coupled to the external power supply when the doorbell detects the first movement of the outer housing.

If the doorbell detects movement but also detects that the doorbell is not electrically coupled to the external power supply, then the doorbell may assume that the movement is by an authorized individual because typically only authorized individuals have access to an electrical control panel of the external power supply to cut the electricity to the doorbell. In contrast, thieves typically do not have access to the electrical control panel. Thus, the doorbell may assume that movement that is not preceded by cutting electricity to the doorbell could be caused by a thief (or perhaps by a careless owner who needs a warning to avoid electrocution).

Referring now to FIG. 4, some embodiments include emitting a sound 496 from the speaker 488 of the doorbell 202. The doorbell 202 can emit the sound 496 based on electricity from the external power supply 312 while the doorbell 202 is electrically coupled to the external power supply 312 (shown in FIG. 3). Then, once the connection to the external power supply 312 is severed by decoupling the doorbell from the building 300, the doorbell can continue to emit the sound 496 based on electricity from the battery 462 of the doorbell 202.

Some methods include configuring the doorbell 202 to continue to emit the sound 496 of the first alert for at least five seconds after the doorbell 202 is electrically decoupled from the external power supply 312 (shown in FIG. 3). For example, a thief could tear a doorbell off of a wall and then could start running. Continuing to emit the sound could encourage the thief to leave the doorbell rather than continue to draw attention to himself by running while carrying an object that is emitting a loud alarm. The doorbell can be configured such that the battery provides power to enable the doorbell to continue to emit the sound from the speaker after the doorbell is electrically decoupled from the external power supply.

Several embodiments include detecting a second movement of the outer housing, and then the doorbell system blocking a second alert from being emitted from the speaker of the doorbell. The blocking can be in response to the doorbell not being electrically coupled to the external power supply when the doorbell detected the second movement. The blocking can be in response to the remote computing device receiving a command from a user of the remote computing device while the remote computing device is authorized to adjust at least one setting of the doorbell.

The command can be based on an input that the user made while using application software (e.g., on a smartphone or on another type of remote computing device). For example, the user can configure the doorbell such that it does not emit alerts. This approach can be advantageous by providing a time in which the user can make adjustments to the outer housing of the doorbell without the doorbell emitting an alarm. In some embodiments, the time can be a predetermined time such that the doorbell system automatically reverts to a state of providing alerts in response to movement of the outer housing after a predetermined amount of time.

Referring now to FIG. 3, some methods include simultaneously emitting the first alert from the doorbell 202, the chime 302, and the remote computing device 204 after the doorbell 202 is decoupled from the external power supply. This simultaneous emitting can be in response to the doorbell 202 detecting the first movement. The first alert can have different forms and characteristics when emitted by the doorbell, the chime, and/or the remote computing device. For example, the first alert emitted from the doorbell can be a first sound, the first alert emitted by the chime can be a second sound, and the first alert emitted by the remote computing device can be text and/or a picture taken by the camera of the doorbell.

Some embodiments include connecting the doorbell 202 to an external power supply 312; connecting the doorbell to a wireless local area network 308; and/or recording a video using the camera assembly 208 of the doorbell 202 in response to detecting the first movement and in response to the doorbell 202 being electrically coupled to the external power supply 312 while detecting the first movement of the outer housing 224. Embodiments can also include sending at least a portion of the video from the doorbell 202 to the remote computing device 204 via the wireless local area network 308 after the doorbell 202 is decoupled from the external power supply 312 and before the doorbell leaves the communication range of the wireless local area network 308; and/or using the battery 462 (shown in FIG. 4) to provide power to the doorbell 202 to send the portion of the video after the doorbell 202 is decoupled from the external power supply 312 and before the doorbell 202 leaves the communication range of the wireless local area network 308.

Referring now to FIG. 4, the movement detection system 528 of the doorbell 202 can comprise an accelerometer 532. Some embodiments include configuring the accelerometer 532 of the doorbell 202 such that an average press of the button 212 does not cause the doorbell system 200 to emit the first alert 232 (shown in FIG. 1).

The average press can be the average force used by visitors to "ring" the doorbell by pressing the button. The average press can be found by having a sample of visitors "ring" the doorbell by pressing the button and then averaging the force used for each "ring" of the doorbell.

Several embodiments include using the accelerometer 532 to detect the first movement of the outer housing 224 of the doorbell 202; and using the doorbell system to emit the first alert in response to the accelerometer 532 detecting the first movement of the outer housing 224 of the doorbell 202.

Referring now to FIG. 3, the chime 302 can be configured to emit a first sound in response to the visitor pressing the button 212. Emitting the first alert can comprise emitting a second sound from the chime 302. The second sound can be different than the first sound. In some embodiments, the ringtone of the first sound is different than the ringtone of the second sound.

Embodiments can include many different types of alerts. The first alert can comprise sending a notification to the remote computing device and/or emitting a first sound from the speaker of the doorbell. Some embodiments include different types of alerts, such as the alerts described in the material incorporated by reference herein.

In several embodiments, the first alert comprises a sound. Embodiments can include emitting the sound of the first alert from the speaker of the doorbell in response to detecting the first movement of the outer housing of the doorbell and in response to the doorbell being electrically coupled to an external power supply while detecting the first movement of the outer housing. The doorbell can be configured to not emit the sound of the first alert if the doorbell is not electrically coupled to the external power supply when the doorbell detects the first movement of the outer housing. The doorbell system can detect the movement of the outer housing and then can decide to not emit an alert because it does not detect electricity from the external power supply. The doorbell, or another part of the doorbell system, can block the alert in response to the doorbell being electrically uncoupled from the external power supply prior to the doorbell detecting the movement of the outer housing (e.g., movement of the doorbell not including movement of the button configured to sound the chime).

Some embodiments include configuring the doorbell system to emit the first alert in response to detecting the first movement of the outer housing of the doorbell above a predetermined threshold such that the doorbell system is configured to not emit the first alert in response to detecting a second movement of the outer housing that is less than the predetermined threshold. In several embodiments, the predetermined threshold can be an acceleration threshold.

FIG. 5 illustrates a back view of the doorbell 202. A mounting bracket 420 can couple the doorbell 202 to a wall of a building 300 (shown in FIG. 3). Some embodiments include screwing the mounting bracket 420 to a wall, and then coupling the outer housing 224 to the mounting bracket 420.

Figure 6:
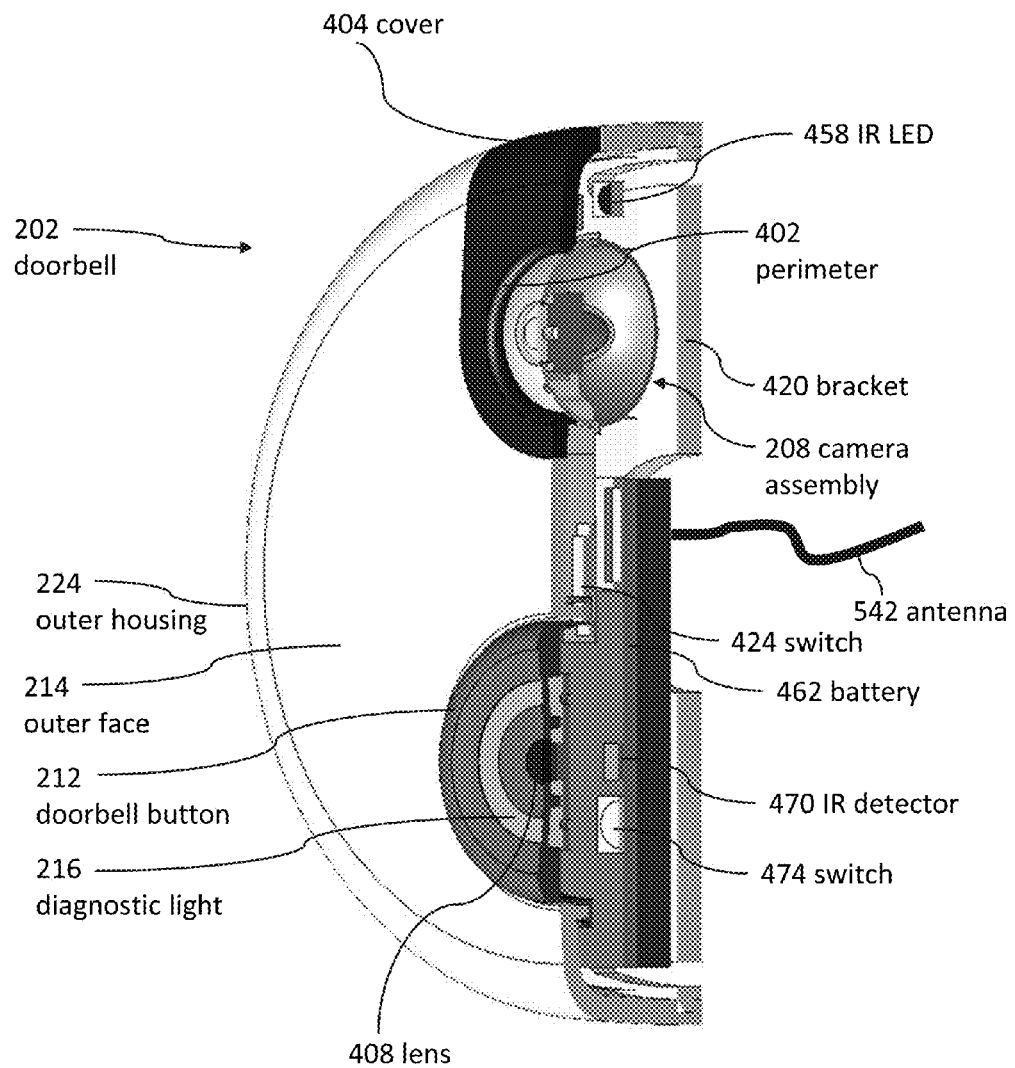
FIG. 6 illustrates a perspective cross-sectional view of the doorbell from FIG. 1, according to some embodiments.

FIG. 6 illustrates a perspective cross-sectional view of the doorbell 202. A switch 424 is covered by the outer housing 224 of the doorbell 202. The switch 424 can be part of the movement detection system 528 (shown in FIG. 4). For example, the switch 424 can be electrically coupled to other portions of the movement detection system 528 via the PCB 516 (shown in FIG. 4).

The switch 424 can be configured such that removing the doorbell 202 from a building to which the doorbell is coupled triggers the switch 424. For example, the switch can be configured such that coupling the outer housing 242 to a mounting bracket 420 compresses the switch (e.g., because the switch is located between a portion of the outer housing 242 and the bracket 420). Then, removing the outer housing 242 from the mounting bracket 420 can decompress the switch 424, which can notify any portion of the system 200 (shown in FIG. 1) that the outer housing 224 has been removed from the mounting bracket 420.

Some embodiments include using the movement detection system to detect a triggering of the switch 424 caused by removing the doorbell 202 from the building; and/or emitting the first alert in response to detecting the triggering of the switch 424 and in response to the doorbell being electrically coupled to an external power supply 312 (shown in FIG. 3) while detecting the triggering of the switch 424. Emitting the first alert can comprise sending a notification from the doorbell 202 to the remote computing device 204 (shown in FIG. 3).

Figure 7:
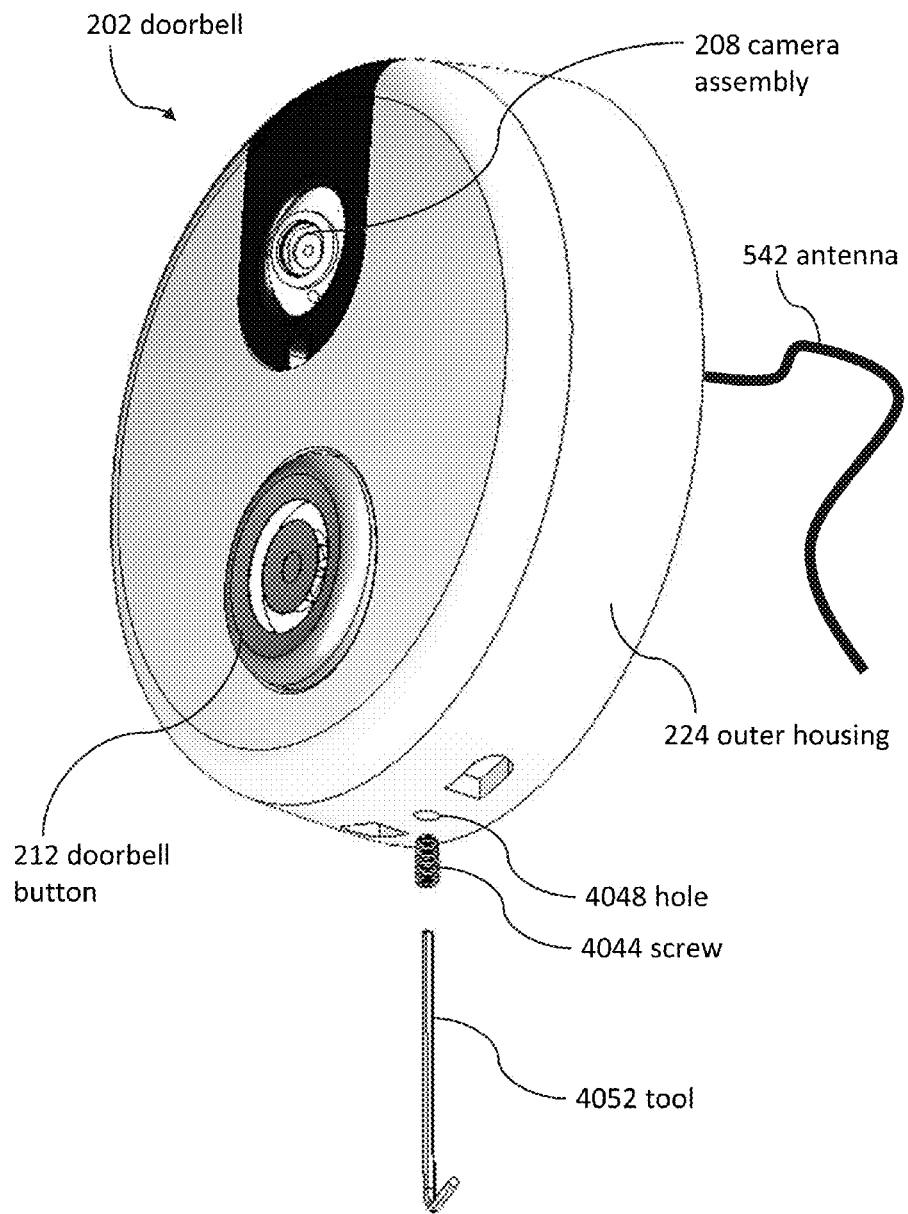
FIG. 7 illustrates a perspective view of a screw that couples the outer housing of the doorbell from FIG. 1 to a mounting bracket, according to some embodiments.

FIG. 7 illustrates a perspective view of a screw 4044 that couples the outer housing 224 to a mounting bracket 420 (shown in FIG. 5). A threaded screw 4044 (e.g., a setscrew or any suitable screw) is rotated through a hole 4048 in the outer housing 224 by a tool 4052 (e.g., an Allen wrench, a hex wrench, a screwdriver). The threaded screw 4044 passes at least partially through the hole 4048 and into a portion of the bracket 420 (not shown). The hole 4048 can be located at a bottom portion of the outer housing 224 and/or along an outer perimeter of the outer housing 224. In some embodiments, the outer housing 224 includes a cylindrical shape and the hole 4048 is located on an outer, curved portion of the cylindrical shape.

Figures 8, 9:
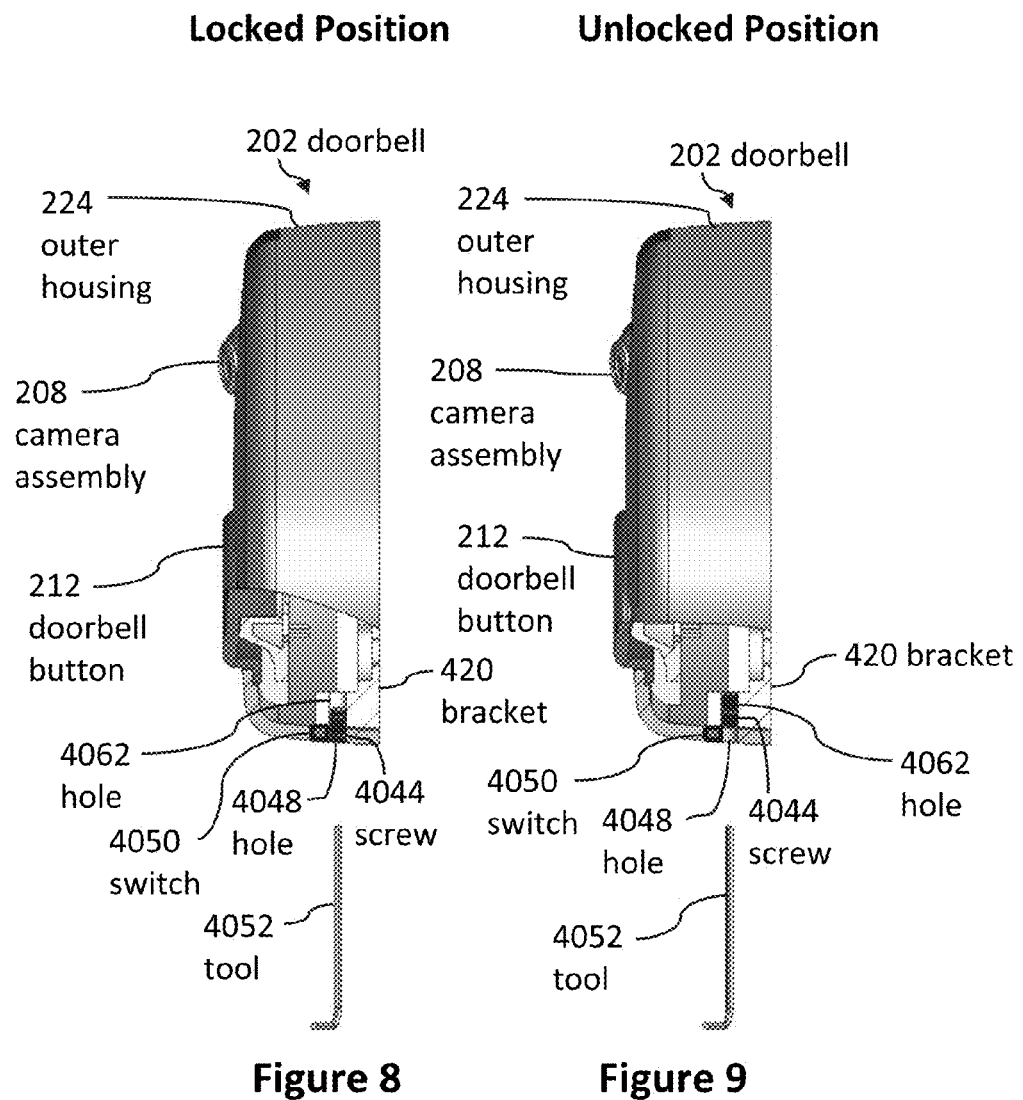
FIGS. 8 and 9 illustrate side views of the doorbell from FIG. 1 with a partial cross section to illustrate how the screw can secure the outer housing to the mounting bracket, according to some embodiments.

FIGS. 8 and 9 illustrate side views with a partial cross section to illustrate how the screw 4044 can pass through the hole 4048 in the outer housing 224 and into a hole 4062 of the bracket 420. The hole 4062 of the bracket 420 can be threaded. FIG. 8 illustrates the outer housing 224 in a locked position (e.g., the screw 4044 is coupled to the hole 4062 in the bracket 420 and protrudes into the hole 4048 of the outer housing 224 such that the outer housing 224 is coupled to the bracket 420). FIG. 9 illustrates the outer housing 224 in an unlocked position (e.g., the screw 4044 does not protrude into the hole 4048 of the outer housing 224 such that the outer housing 224 can be removed from the bracket 420). Some embodiments include coupling the bracket 420 to a wall by screwing screws into the wall in a first direction and coupling an outer housing 224 (e.g., of a doorbell security system) to the bracket 420 by screwing a screw in a second direction, wherein the first direction is perpendicular to the plane of the wall and the second direction is angled at 70 degrees to 110 degrees relative to the first direction (e.g., the second direction is parallel to the plane of the wall).

Referring now to FIGS. 8 and 9, the mounting bracket 420 can be metal and/or molded plastic. The screw 4044 can secure the outer housing 224 to the mounting bracket 420. The movement detection system 528 (shown in FIG. 4) can be configured to detect when the screw 4044 is moved to uncouple the outer housing 224 from the mounting bracket 420. For example, moving the screw 4044 more than a predetermined amount can cause the screw 4044 to lose contact with a switch 4050, which can notify the doorbell 202 that the screw 4044 has moved.

The switch 4050 can be a contact switch or an optical switch configured to detect the presence of the screw 4044. The switch 4050 can be part of the movement detection system 528 such that movement of the screw 4044 without first cutting the external power supply (e.g., via a circuit breaker) and/or without receiving a command from a remote computing device can cause the doorbell 202 to emit an alarm sound.

Embodiments related to any of the Figures described herein can include using the movement detection system to detect screw movement; and/or emitting the first alert in response to detecting the screw movement and in response to the doorbell being electrically coupled to an external power supply while detecting the first movement. Emitting the first alert can comprise emitting a first sound from the speaker of the doorbell.

Embodiments can include obtaining the doorbell that comprises an outer housing, a movement detection system, a speaker, and a button configurable to enable a visitor to sound a chime. The movement detection system can be configured to detect movement of the outer housing of the doorbell. Embodiments can include configuring the doorbell to emit a first alert in response to detecting a first movement of the outer housing of the doorbell; and/or using the movement detection system of the doorbell to detect the first movement of the outer housing.

Some embodiments comprise blocking the doorbell from emitting the first alert. The doorbell system can block the doorbell from emitting the first alert in response to detecting that the doorbell is not electrically coupled to an external power supply within five seconds of the doorbell detecting the first movement of the outer housing. (If the doorbell is electrically coupled to an external power supply when the doorbell detects the first movement of the outer housing, then the doorbell is electrically coupled to an external power supply within five seconds of the doorbell detecting the first movement of the housing.)

The doorbell system can detect whether the doorbell is electrically coupled to an external power supply in many different ways. In some embodiments, the doorbell can detect that the doorbell is electrically coupled to an external power supply by having electricity to operate (other than from the battery).

In some embodiments, the movement detection system of the doorbell comprises an accelerometer. Embodiments can include configuring the accelerometer of the doorbell such that an average press of the button does not cause the doorbell to detect the first movement of the outer housing; and/or using the accelerometer to detect the first movement of the outer housing of the doorbell.

Although some embodiments are described in the context of methods, the method embodiments can also be formulated as devices and systems. Methods described herein can be applied to the material (e.g., the devices and systems) incorporated by references herein.

Referring now to FIG. 3, several embodiments comprise a doorbell 202 configured to discourage tampering. The doorbell 202 can comprise an outer housing 224 and a button 202 configured to enable a visitor to sound a chime 302. The button 212 can be coupled to the outer housing 224. Doorbells 202 can also include an accelerometer 532 (shown in FIG. 4) coupled to the outer housing 224 such that the accelerometer 532 is configured to detect movement of the outer housing 224 of the doorbell 202. Doorbells 202 can also include a speaker 488 (shown in FIG. 4) coupled to the outer housing 224. The speaker 488 can be configured to emit a first alert in response to the accelerometer 532 detecting movement of the outer housing 224 of the doorbell 202.

Doorbell embodiments can also include a power detection system 432 (e.g., a portion of the chip 480 shown in FIG. 4) configured to detect whether the doorbell 202 is electrically coupled to an external power supply 312.

Referring now to FIG. 4, doorbells can also include an electronic control system 436 (e.g., a portion of the chip 480) electrically coupled to the speaker 488 such that the speaker emits the first alert in response to the accelerometer 532 detecting the movement of the outer housing 224 of the doorbell 202 and in response to the power detection system 432 detecting the external power supply 312 (shown in FIG. 3). The power detection system 432 is configured such that it does not detect the external power supply 312 if the circuit breaker is tripped to cut power from the external power supply 312 to the doorbell 202. The doorbell 202 can decide not to emit the first alert unless the doorbell 202 detects both the movement and the external power.

Embodiments can also include a wireless communication system (e.g., the communication module 504) configured to send a second alert to a remote computing device 204 (shown in FIG. 3) in response to the accelerometer 532 detecting the movement of the outer housing 224 of the doorbell 202 and in response to the power detection system 432 detecting the external power supply 312 (shown in FIG. 3). Doorbells 202 can also include a battery 462 configured to provide power to enable the doorbell 202 to continue to emit the first alert from the speaker 488 after the doorbell 202 is electrically decoupled from the external power supply 312 (shown in FIG. 3).

Antenna Embodiments

Wireless communication can be based on the use of high-frequency radio waves to transmit information from one device to another. Data can be sent and received on specific radio frequencies to technologies and devices that have transmitters and receivers. These transmitters and receivers can be built into devices such as routers, cell phones, computers, and tablets. Antennas can be an integral part of these systems, as they can receive data from incoming signals and transmit data as an outgoing signal. An antenna's ability to transmit and receive information can be affected by a variety of factors, some of which include, but are not limited to, physical structures, or obstructions, and the range and type of antenna. In embodiments where the ability of an antenna to transmit or receive information may be affected by various circumstances, a doorbell can utilize an antenna extending through a hole in the wall to enable the doorbell to send and receive wireless signals with a remotely located communicating device. The extended antenna can allow the wireless signals to reach the antenna in a direction that is less obstructed than would be the case if the wireless signals tried to reach the antenna in a direction that requires going through the outer housing of the doorbell.

Placing the antenna in a hole in the wall can position the antenna closer to a wireless router of a building than would typically be the case if the antenna were located completely inside the outer housing the doorbell. This advantage, combined with the advantage of the signal not having to go through the outer housing of the doorbell, can lead to dramatically improved wireless communication. Many homeowners struggle with wireless performance because their wireless networks are weak outside their homes near their doors. Thus, dramatically improving the wireless communication abilities of the doorbell is very important and solves a fundamental weakness of past systems.

Figure 10:
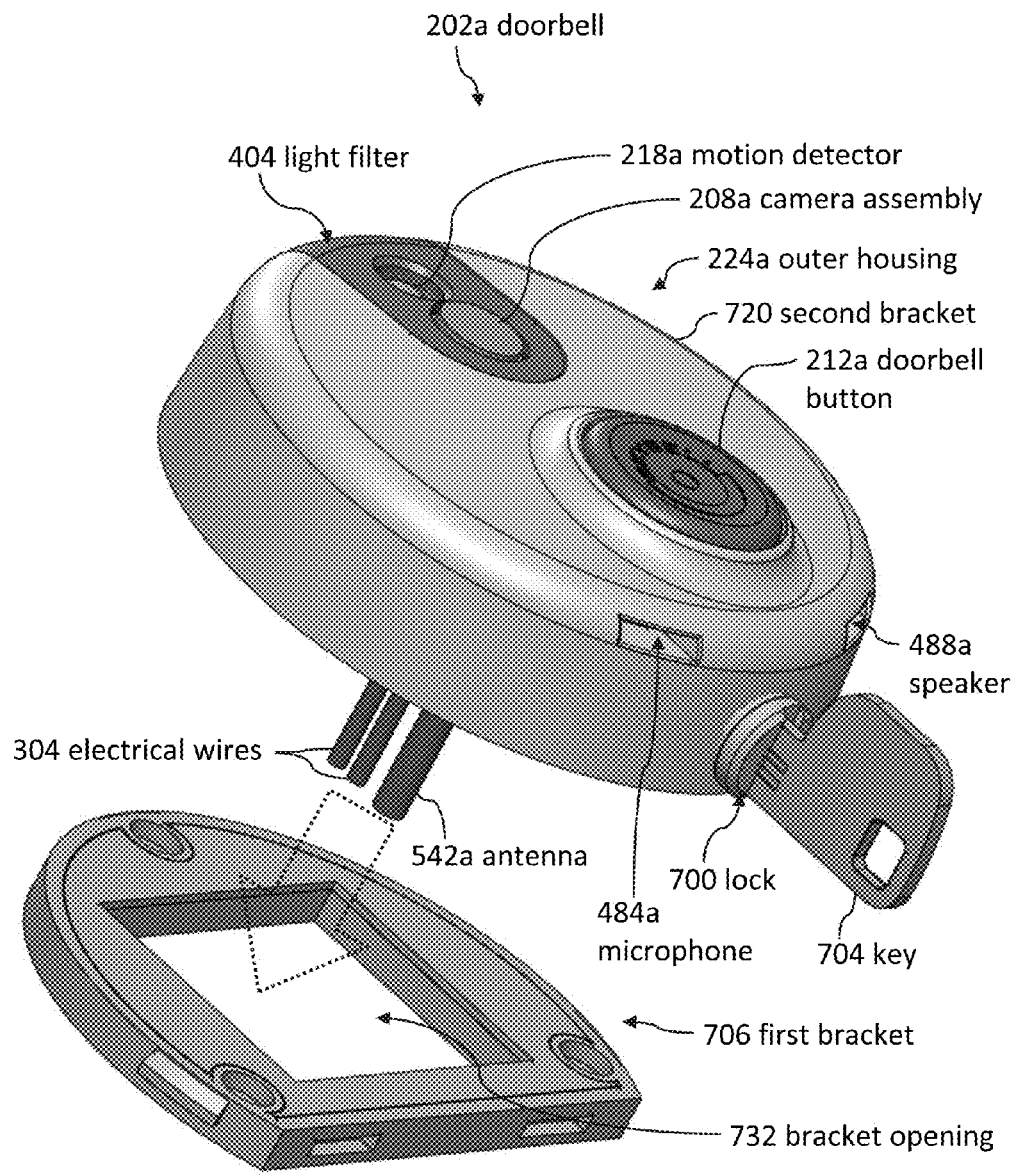
FIG. 10 illustrates a perspective view of a doorbell, according to some embodiments.
Figure 14:
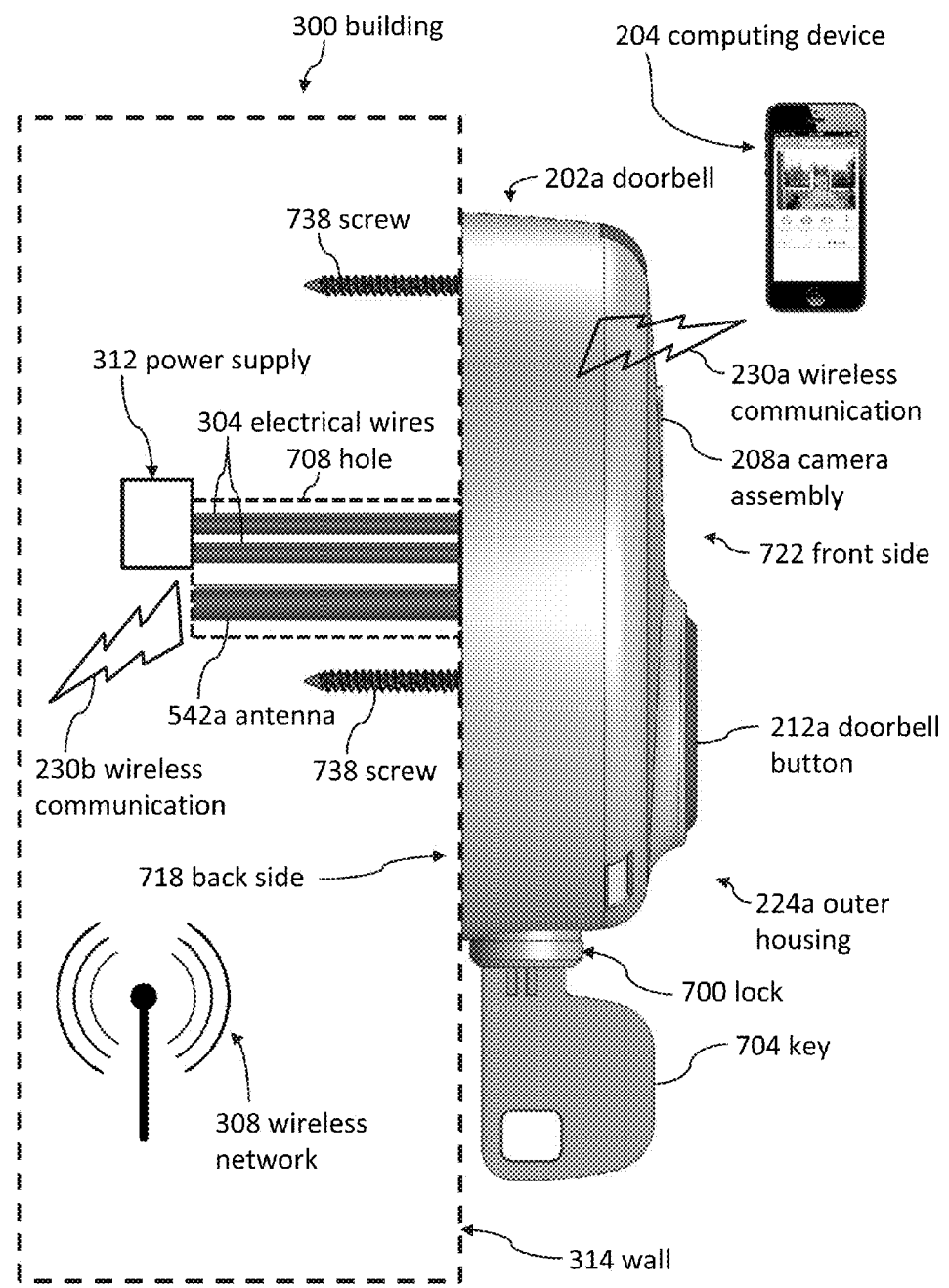
FIG. 14 illustrates a side view a doorbell coupled to a wall, according to some embodiments.

FIG. 10 illustrates a perspective view of a doorbell 202a that can be configured to wirelessly communicate with a remotely located computing device 204 (shown in FIG. 14). The doorbell 202a can comprise an outer housing 224a and a button 212a that can be configured to enable a visitor to sound a chime 302 (shown in FIG. 3). The button 212a can be coupled to the outer housing 224a. The doorbell 202a can include an antenna 542a coupled to the outer housing 224a and configurable to enable the doorbell 202a to wirelessly communicate with the remotely located computing device 204 (shown in FIG. 14).

FIG. 14 illustrates a side view of a doorbell 202a. The outer housing can comprise a back side 718 that can be configured to face toward a wall 314, to which the doorbell 202a can be mounted. A portion of the antenna 542a can be located inside a hole 708 in the wall 314. The hole 708 can be a hole that was created when the building 300 was constructed to provide a channel for electrical wires 304 that can provide power (e.g., low-voltage power) to a wide range of doorbells.

The hole 708 of the doorbell 202a can comprise at least one electrical wire 304 that electrically couples the doorbell 202a to an external power supply 312. The antenna 542a can be configured to run alongside a portion of the electrical wire 304. The antenna 542a of the doorbell 202a can exit the back side 718 of the outer housing 224a and can be configured to extend at least one inch into the hole 708. The extension of the antenna 542a into the hole 708 in the wall 314 allows a wireless communication 230b to reach the antenna 542a without having to travel through the outer housing 224a and/or without having to travel outside the building 300. (The router that creates the wireless network 308 can be located inside the building 300.)

In some embodiments, the doorbell antenna 542a can comprise a bendable metal protrusion that can be placed at least partially into the hole 708. A portion of the bendable metal protrusion can be located inside the hole 708 of the wall 314 while the doorbell 202a can be mounted to the wall 314. The hole 708 can comprise at least one electrical wire 304 that electrically couples the doorbell 202a to an external power supply 312. The antenna 542a can run alongside a portion of the electrical wire 304.

The antenna system can convert electrical power into radio waves and can convert radio waves into electrical power. The antenna 542a can comprise a metallic conductor that is electrically coupled to a receiver and/or a transmitter. At least a portion of the antenna 542a can be located outside the outer housing 224a while the antenna 542a is electrically coupled to a receiver and/or a transmitter that is located inside the outer housing 224a.

Referring to FIG. 10, in some embodiments, the doorbell 202a can comprise a camera 208a. The antenna 542a can be configured to wirelessly communicate pictures 252 (shown in FIG. 2) taken by the camera 208a. The pictures 252 can be transmitted from the doorbell 202a to the remotely located computing device 204 (FIG. 14).

FIG. 10 illustrates how, in some embodiments, the doorbell 202a can comprise a speaker 488a and a microphone 484a that can be coupled to the outer housing 224a. The speaker 488a can be configured to emit a first sound from the remotely located computing device. The microphone 484a can be configured to record a second sound from the visitor. The antenna 542a can be configured to wirelessly communicate the second sound to a remotely located computing device (e.g. via the wireless network 308, via a cellular network, via the Internet).

In some embodiments, the doorbell 202a can comprise a wireless communication system (e.g., the communication module 504 shown in FIG. 4) that can be configured to send a first alert 232 (shown in FIG. 1) to the remote computing device 204 in response to the detection of a visitor. The antenna 542a can be electrically coupled to the wireless communication system while the wireless communication system can be located inside the outer housing 224a of the doorbell 202a. As shown in FIG. 14, the antenna 542a can extend from a back side 718 of the doorbell 202a into a hole 708 of a wall 314 to which the doorbell 202a is coupled. The antenna 542a can extend into the hole 708 while running alongside an electrical wire 304 that can provide electricity from an external power supply 312 (shown in FIG. 3) to the doorbell 202a.

The chime can be a speaker 488a (shown in FIG. 10) located inside the outer housing 224a (e.g., as shown by the speaker 488 in FIG. 4). In several embodiments, the chime 302 can be located remotely relative to the doorbell 202a (as shown in FIG. 3).

While some materials, such as wood and plastic, sometimes do not severely obstruct wireless signals, other materials, including metal, can more easily interfere with the wireless radio waves and weaken or block the signal. Some individuals may prefer parts of the doorbell to be fabricated from materials that can obstruct wireless signal transmissions. For example, some users may prefer a metal doorbell housing, which can look good, but can also dramatically reduce the wireless performance of the doorbell.

Referring now to FIG. 14, in some embodiments, the outer housing 224a can comprise materials (e.g., metal) that can obstruct a wireless communication 230a with the remotely located computing device 204. The outer housing 224a of the doorbell 202a can comprise a metal plate 726 (shown in FIG. 11) that can be outwardly visible and can reduce a first signal strength of a first wireless communication 230a in a first direction. In some embodiments, the metal plate 726 can be located on the front side 722 of the outer housing 224a, while the sides of the outer housing 224a, can be a different material (such as plastic). The antenna 542a can extend from the outer housing 224a in a second direction away from the metal plate 726. For example, at the detection of a visitor, the doorbell 202a can attempt to send a wireless signal to a remote computing device 204, such as a smartphone. However, the metal plate 726 of the outer housing 224a, could block the radio wave of the wireless communication 230a. Instead, with the antenna 542a extending away from the outer housing 224a in a second direction, the wireless communication 230b could take a different path and be sent through a different material, such as the drywall or wood of the wall, or through a nonmetal portion of the outer housing 224a. The doorbell 202a can then successfully send an alert 232 (shown in FIG. 1) to the remote computing device 204. With the antenna 542a extending in a second direction, for example beyond back side 718 of the doorbell 202a, the doorbell can be capable of a wireless communication 230a with the remotely located computing device 204 without relying on communicating via the first direction.

In several embodiments, a doorbell 202a can be configured to wirelessly communicate with a remotely located computing device 204 (shown in FIG. 14). The doorbell 202a can comprise an outer housing 224a, a button 212a, a chime 302 (shown in FIG. 3), an antenna 542a, and a metal plate 726 (shown in FIG. 11). The button 212a can be configured to enable a visitor to sound a chime 302 (shown in FIG. 3) and can be coupled to the outer housing 224a. The antenna 542a can be coupled to the outer housing 224a and can be configurable to enable the doorbell 202a to wirelessly communicate with the remotely located computing device 204. The metal plate 726 can be outwardly visible. The antenna 542a can extend away from the metal plate 726.

Figure 11:
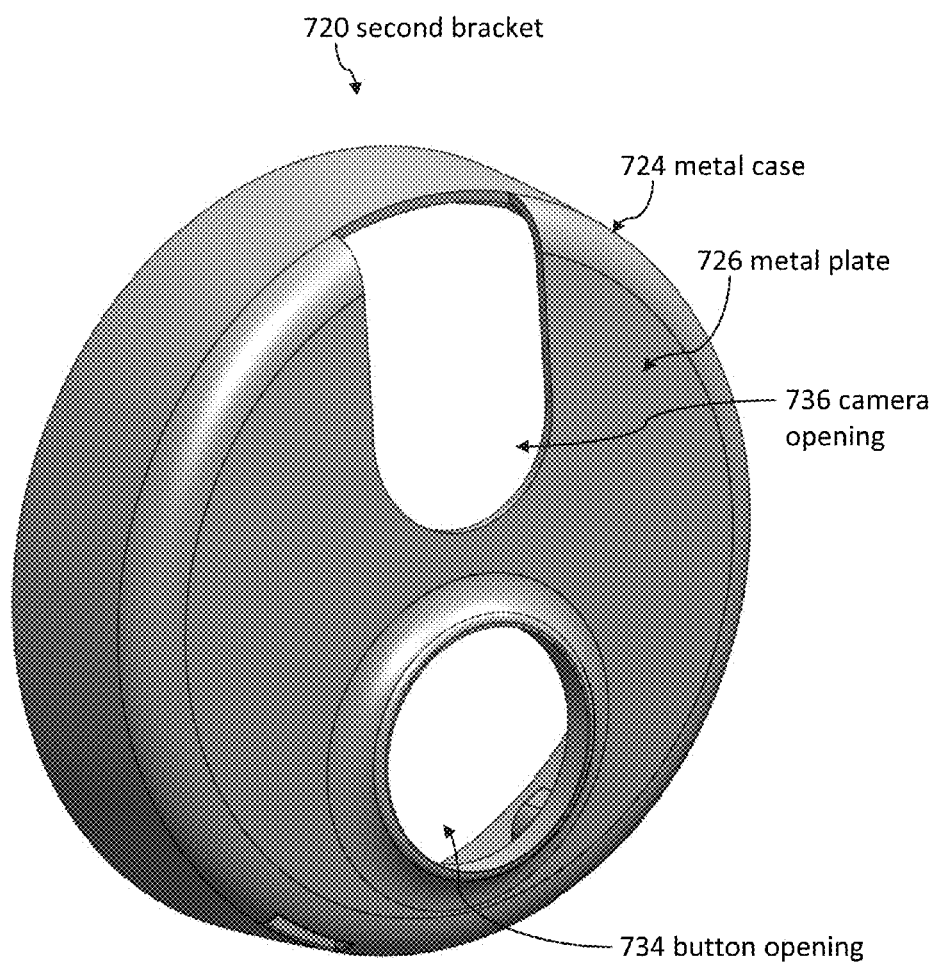
FIG. 11 illustrates a perspective view of a second bracket, according to some embodiments.

As illustrated in FIG. 11, in some embodiments, the outer housing 224a can comprise a metal case 724 that is outwardly visible and/or can at least partially surround the doorbell 202a. With the metal case 724, the front and sides of the outer housing can be constructed of metal, instead of only the front side 722 (labeled in FIG. 14). The metal case 724 can reduce a first signal strength of a first wireless communication 230a in a first direction. The antenna 542a can extend from the outer housing 224a in a second direction away from the metal case 724 such that the doorbell 202a can be capable of wirelessly communicating with the remotely located computing device 204 without relying on communicating via the first direction.

Doorbell Bracket and Lock Embodiments

Figure 12:
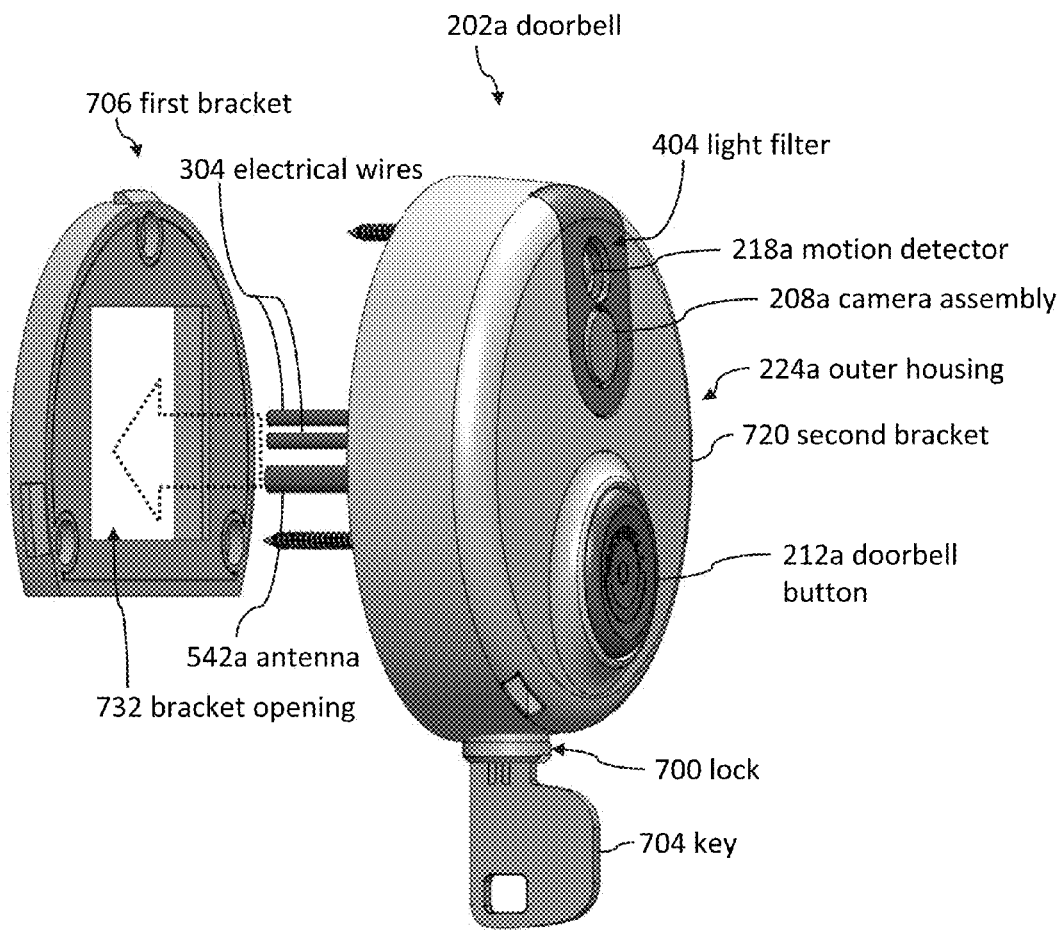
FIG. 12 illustrates a perspective view of a doorbell just before it is coupled to a first bracket that is attached to a wall, according to some embodiments.

FIG. 10 illustrates a doorbell system, which can comprise a first bracket 706 that can be configured to couple the doorbell 202a to the wall 314 (shown in FIG. 14). The antenna 542a can extend into the hole 708 (shown in FIG. 14) through the first bracket 706. The first bracket 706 can be located between the hole 708 and the outer housing 224a. The antenna 542a can extend from the outer housing 224a, such that the portion of the antenna 542a can be located on an opposite side of the first bracket 706 relative to the outer housing 224a. In this embodiment, the antenna 542a extends in a second direction from the outer housing 224a and through the bracket opening 732. The arrow in FIG. 12 illustrates the direction in which the doorbell is mounted and how the antenna 542a and electrical wires 304 can pass through the first bracket 706 by means of the bracket opening 732. The antenna can then extend into a hole 708 in a wall 314 (shown in FIG. 14).

Figure 13:
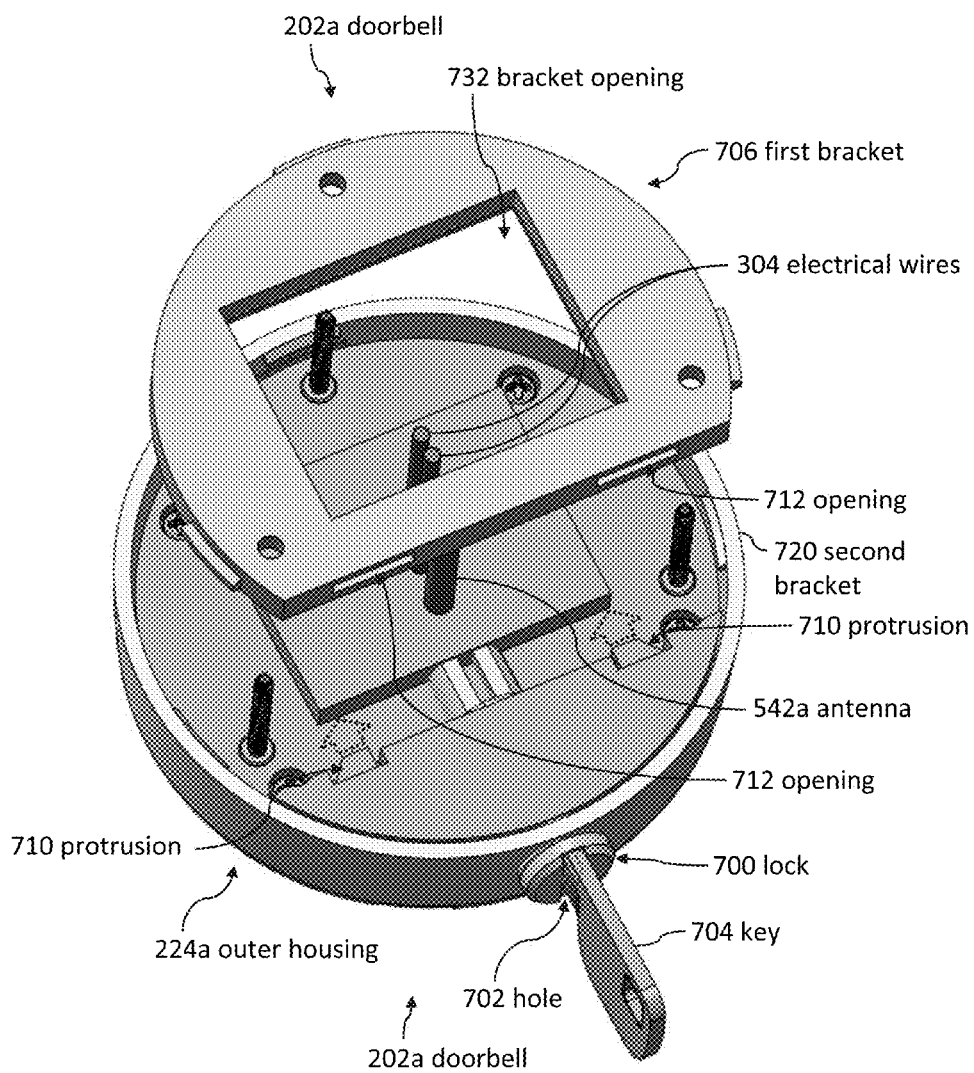
FIG. 13 illustrates a perspective view of the back of a doorbell, according to some embodiments.
Figure 15:
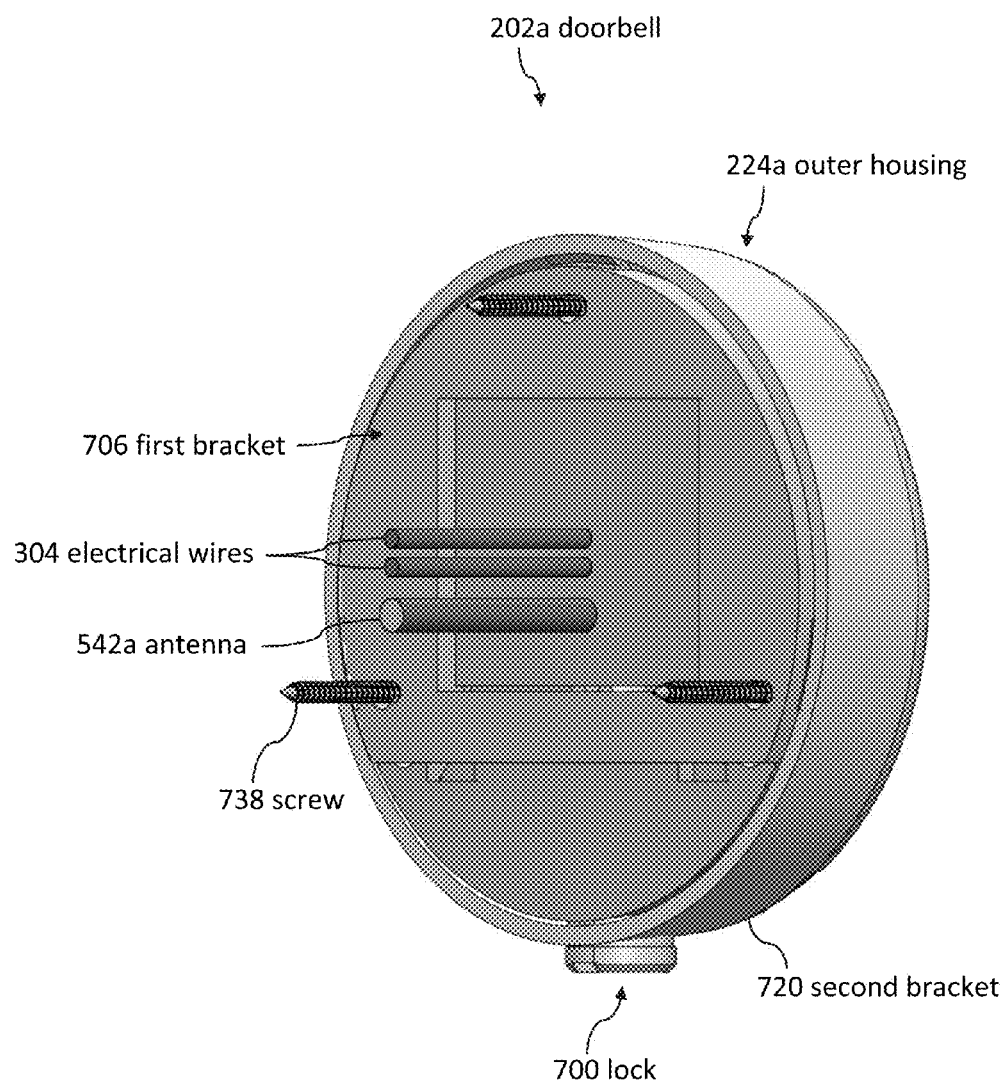
FIG. 15 illustrates a perspective view of the back of a doorbell after the first bracket is coupled to the outer housing, according to some embodiments.

FIG. 13 shows a perspective view of the back of a doorbell 202a and illustrates how the first bracket 706 interfaces with the doorbell 202a. FIG. 15 illustrates a perspective view of the assembly of the first bracket 706 with the outer housing 224a. The outer housing 224a can be fabricated of different materials, and in some embodiments can be a metal case 724 (shown in FIG. 11). The first bracket 706 can be molded plastic.

Referring to FIGS. 10 and 14, the metal plate 726 (shown in FIG. 11) can reduce a first signal strength of a first wireless communication 230a in a first direction. The antenna 452a can extend from the outer housing 224a in a second direction 230b away from the metal plate 726 such that the doorbell 202a can be capable of wirelessly communicating with the remotely located computing device 204 (shown in FIG. 14) without relying on communicating via the first direction. The doorbell 202a can further comprise a mounting bracket 706 that can couple the doorbell to a wall 314 of a building 300. The antenna 542a can extend from the outer housing 224a, past the mounting bracket 706, through the bracket opening 732, and into a hole 708 in the wall 314. The hole 708 can comprise at least one electrical wire 304 that electrically couples the doorbell 202a to an external power supply 312. The antenna 542a can be configured to run alongside a portion of the electrical wire 304 inside the hole 708.

Referring now to FIG. 14, the outer housing 224a of the doorbell 202a can comprise a back side 718 that can be configured to face towards a wall 314 to which the doorbell 202a can be mounted. The antenna 542a can exit the back side 718 of the outer housing 224a and can be configured to extend away from the outer housing 224a at least one inch into a hole 708 in the wall 314 while running alongside at least one electrical wire 304. The electrical wire 304 can electrically couple the doorbell 202a to an external power supply 312. The doorbell 202a can further comprise a lock 700 that secures the outer housing 224a to a bracket 706 (shown in FIG. 10). The bracket 706 (shown in FIG. 10) can be configured to couple the doorbell 202a to the wall 314.

FIGS. 13 and 15 further illustrate a method by which the outer housing 224a of the doorbell 202a couples to the bracket 720 using a lock 700. FIG. 13 illustrates how, in some embodiments, the outer housing 224a can be assembled with the back side 718 of the doorbell 202a. By turning a key 704, the locking mechanism can cause locking protrusions 710 to engage openings 712 (e.g., slots) in the bracket 706. The motion of the protrusions 710 is illustrated in FIG. 13 by the arrows. The protrusions 710 can move in and out (as indicated by the arrows) to enter and leave the openings 712. When the protrusions 710 are located inside the openings 712, the protrusions 710 secure the outer housing 224a to the first bracket 706. FIG. 15 shows a perspective view of the back of a doorbell 202a that has been coupled with the bracket 706.

FIG. 10 illustrates how the doorbell 202a can comprise a second metal bracket 720 coupled to the first bracket 706. A majority of the doorbell 202a can be located, at least partially, between the second metal bracket 720 and the first bracket 732. The second metal bracket 720 can be configured to hinder decoupling the doorbell 202a from the wall 314. The second metal bracket 720 can surround a portion of the doorbell 202a, while the antenna 542a can exit the back side 718 of the outer housing 224a. The antenna 542a can be located, at least partially, inside the hole 708 of the wall 314. This embodiment can comprise a lock 700 that secures the first bracket 706 to the second metal bracket 720. FIG. 11 illustrates a second metal bracket 720 that can either fit over an existing outer housing 224a of the doorbell 202a or fit over the components of the doorbell. In this example, when the key 704 is inserted in the lock 700 and turned, the locking protrusions 710 can move in the direction of the arrows (shown in FIG. 13) and engage with slots in the first bracket 706. This can secure the doorbell 202a to the first bracket 706 and the wall 718 (shown in FIG. 14). However, a wide variety of locking methods and mechanisms can be used to couple the second metal bracket 720 to the first bracket 706. FIG. 15 shows a perspective view of the back of a doorbell 202a that has been coupled with the bracket 706.

Referring now to FIGS. 13 and 14, the doorbell 202a can comprise a bracket system that can comprise a first bracket 706 and a second bracket 720. This bracket system is configured to couple the doorbell 202a to the wall 314. The bracket system can wrap around at least a portion of the doorbell 202a, such that the bracket system can be configured to secure the doorbell 202a to the wall 314. The doorbell 202a can further comprise a lock 700 that secures a first portion of the bracket system to a second portion of the bracket system. Unlocking the lock 700 by using the key 704 can facilitate removing the doorbell 202a from the wall 314. For example, the second bracket can be made of a variety of materials and can fit over the housing of the doorbell 202a. When the key 704 is inserted in the lock 700 and turned, the locking protrusions 710 can move in the direction of the arrows (shown in FIG. 13) and engage with openings 712 in the first bracket 706, securing the doorbell 202a to the first bracket 706 and the wall 314. Likewise, unlocking the protrusions 710 can allow the removal of the second bracket 720, and thus permit the removal of the doorbell 202a from the wall 314.

In embodiments comprising a lock 700, the outer housing 224a of the doorbell 202a can be coupled to the first bracket 706 by using a mechanism that can convert a rotational motion into a linear motion. As an example, the mechanism can comprise a cylinder lock, such as a pin tumbler lock, and a cam and follower mechanism. This combination can allow a key 704 to be inserted into a lock 700. When the correct key is used, the cylinder of the lock 700 can rotate. An end cam can be fixed at the top of the cylinder lock, resulting in the rotation of the cam when the key is turned. A follower can convert this rotational motion into a linear motion by tracing the cam profile and moving the protrusions 710 into the openings 706. The key can then be removed from the cylinder lock, preventing the further rotation of the cylinder. This can secure the protrusions 710 in the openings 712 and lock the outer housing 224a of the doorbell 202a to the first bracket 706.

The components of a pin tumbler lock include a cylindrical housing, a cylindrical plug, springs, driver pins, and key pins. The cylindrical housing has a volume removed where the cylindrical plug is inserted. The separation between the housing and plug is referred to as the shear line. The plug has a series of five or six holes drilled in a line along the height of the plug and perpendicular to the axis of the plug. These holes can be aligned to similar holes in the lock housing. The plug can rotate along the shear line when the mechanism is unlocked. When locked, a series of pins and springs, located in the drilled holes, move between the housing and the plug, blocking the shear line and preventing rotation. The key pins are of various lengths determined by the profile of the key. The key pins come into contact with the key when it is inserted in the keyway of the lock. The driver pins are above the key pins. Springs are located in the drilled holes of the housing and are in contact with the driver pins and the housing. When locked, the driver pins are pushed by the springs toward the plug and block the shear line. When a key is inserted, the springs are compressed and the key pins and driver pins move depending on the profile of the key. If the key is correct, the key pins are moved to the correct height and the space between the key pins and the driver pins align with the shear line, allowing the plug to rotate. While the plug can rotate, the key cannot be removed and is held in place by the key pins. The key can rotate 90 degrees before hitting a stop, preventing the cylinder from rotating further. At this stop, another section of springs and driver pins can be located in the lock housing. The key can then be removed because the key pins can move while in contact with the driver pins and springs. Once the key is removed, the springs are no longer compressed and the driver pins move back across the shear line area, preventing the plug from rotating.

With the rotation of the cylinder of the pin tumbler lock, a cam and follower mechanism can be used to convert the rotational motion of the plug into a linear motion to move the protrusion 710 into the opening 712. The cam of the mechanism can be fixed to the end of the plug. The cam can then rotate as a user turns a key 704. The cam can also be a cylinder with the same diameter as the plug cylinder. The cam profile can be located on the top circular face of the cam. This profile can comprise three hemispherical or domed protrusions around the periphery of the cylinder face, in an equidistant radial pattern from the center. The follower of the mechanism can comprise a cylinder of the same diameter with three equidistant domed indentations in a radial pattern around the center of the follower. The top of the follower comprises the protrusions 710 and fits into the outer housing 224a of the doorbell 202a such that the follower does not rotate and can only move linearly. When the domed protrusions of the cam and the domed indentations of the follower are aligned, the cam and follower fit together such that there is no gap between the cam and follower. As the cam rotates, the hemispherical protrusions and indentations no longer align, causing the follower to displace at a distance equal to the height of the domed protrusions. This displacement moves the protrusions 710 into the openings 712. When the user turns the key 90 degrees, the plug hits a stop where the lock housing contains another set of springs and driver pins. The key can then be removed and the protrusions 710 remain in the openings 712. The outer housing 224a of the doorbell is coupled to the first bracket 706.

Unlocking the housing can occur when the key is inserted and rotated to allow the domed protrusions of the cam and the indentations of the follower to align, causing the protrusions 710 to retract and exit the openings 712. If necessary, a spring with a low spring constant can be used to provide a force on the follower and ensure that when the device is unlocked, the domed protrusions of the cam and indentations of the follower align.

In several embodiments, the first bracket 706 is coupled to a wall of a building (e.g., screwed to the wall of a building). The lock 700 couples the outer housing 224a of the doorbell 202a to the first bracket 706. The lock 700 can include a keyhole 702 into which a key 704 can be inserted. The keyhole 702 can be located along an outer perimeter of the doorbell 202a such that the keyhole 702 is located between an outwardly facing side of the doorbell 202a and an inwardly facing side of the doorbell 202a. Protrusions 710 can extend in a direction that is within plus or minus 20 degrees of perpendicular to the backside 718 (shown in FIG. 14). The protrusions 710 can couple the outer housing 224a of the doorbell 202a to the first bracket 706 while the first bracket 706 is coupled to a wall of a building and while the first bracket 706 is located between the wall of the building and the doorbell 202a.

Doorbell Battery Embodiments

Figure 17:
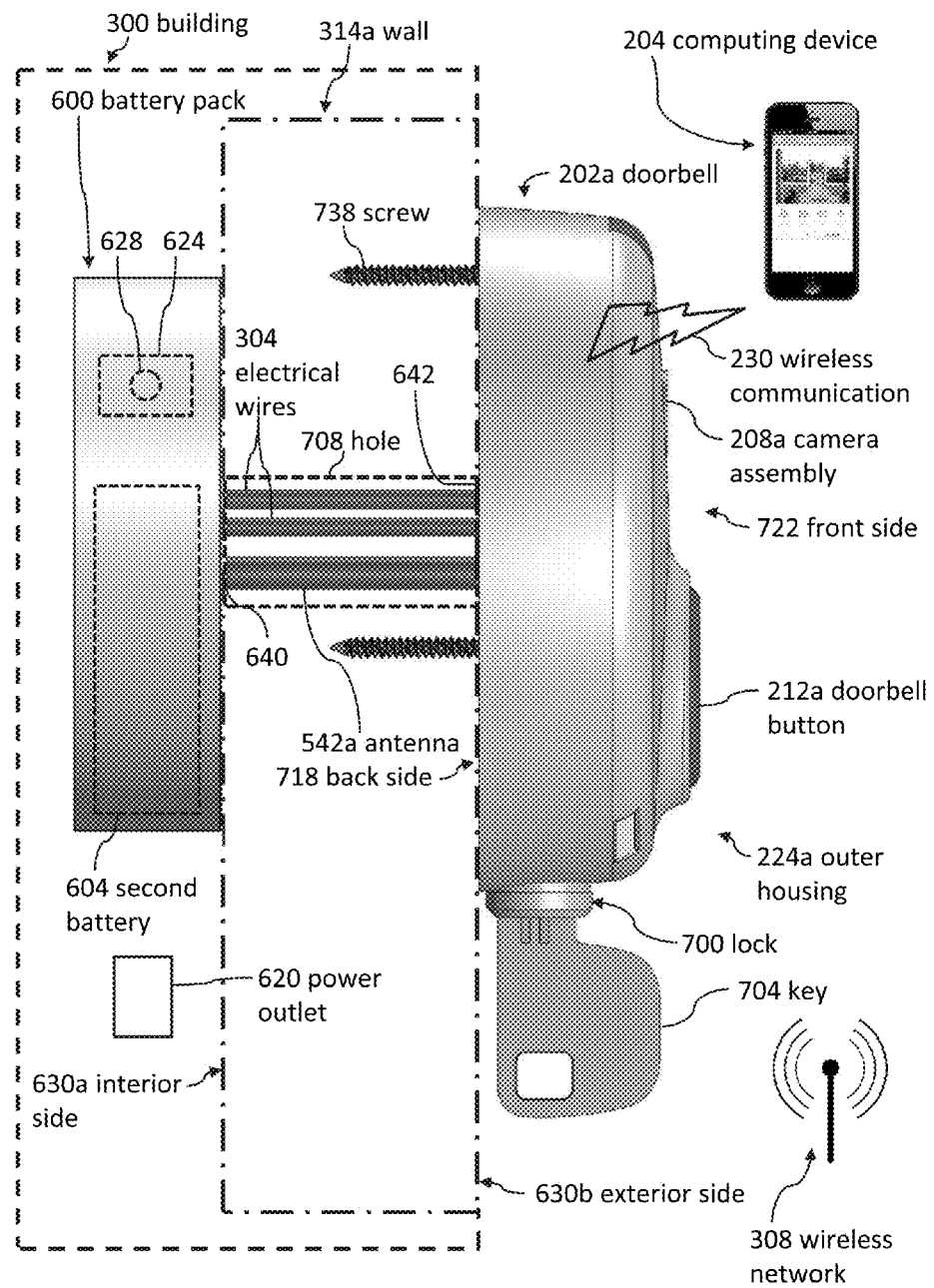
FIGS. 17-19 illustrate side views of a doorbell and a battery pack coupled to a wall, according to some embodiments.
Figure 18:
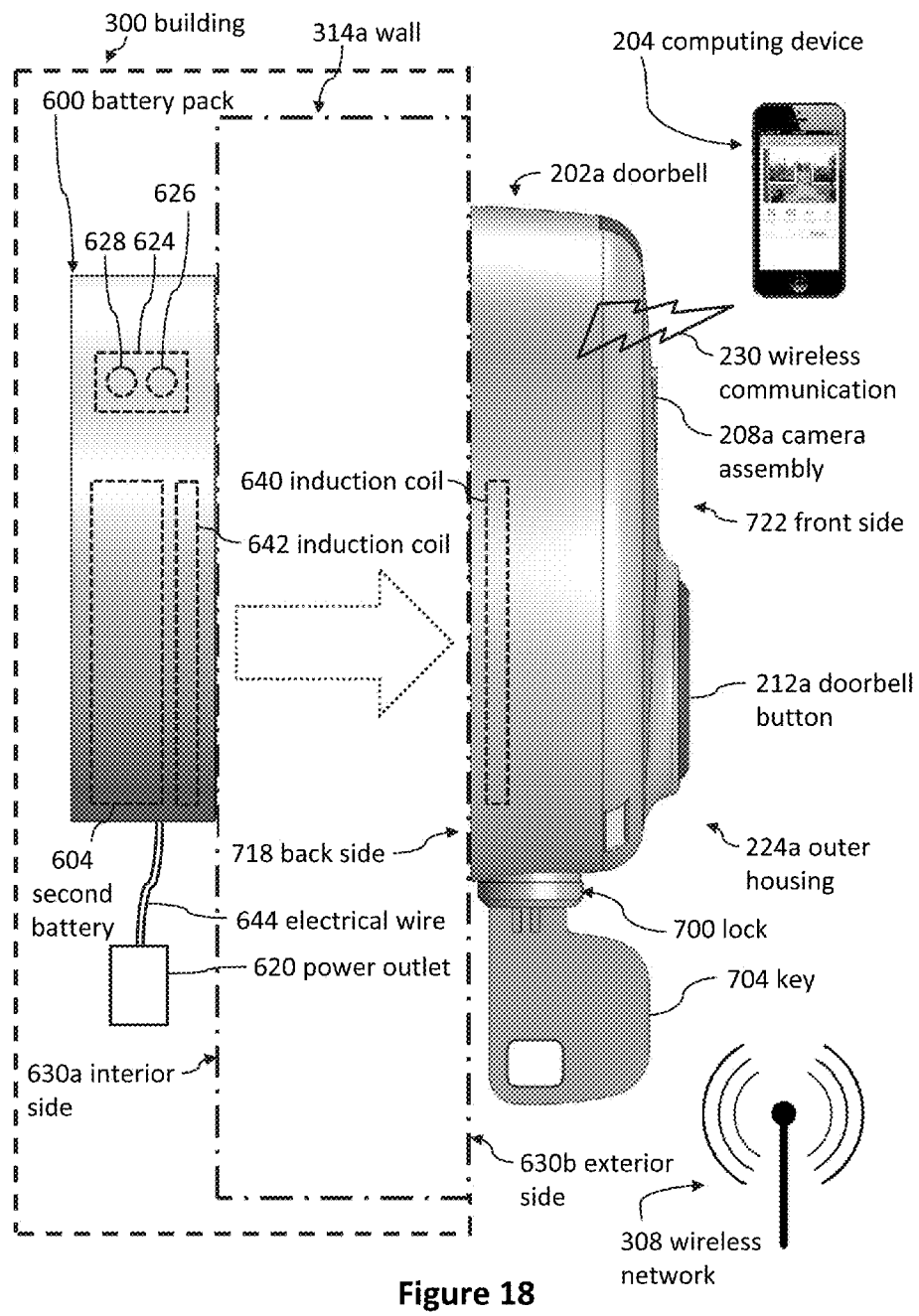
Figure 19:
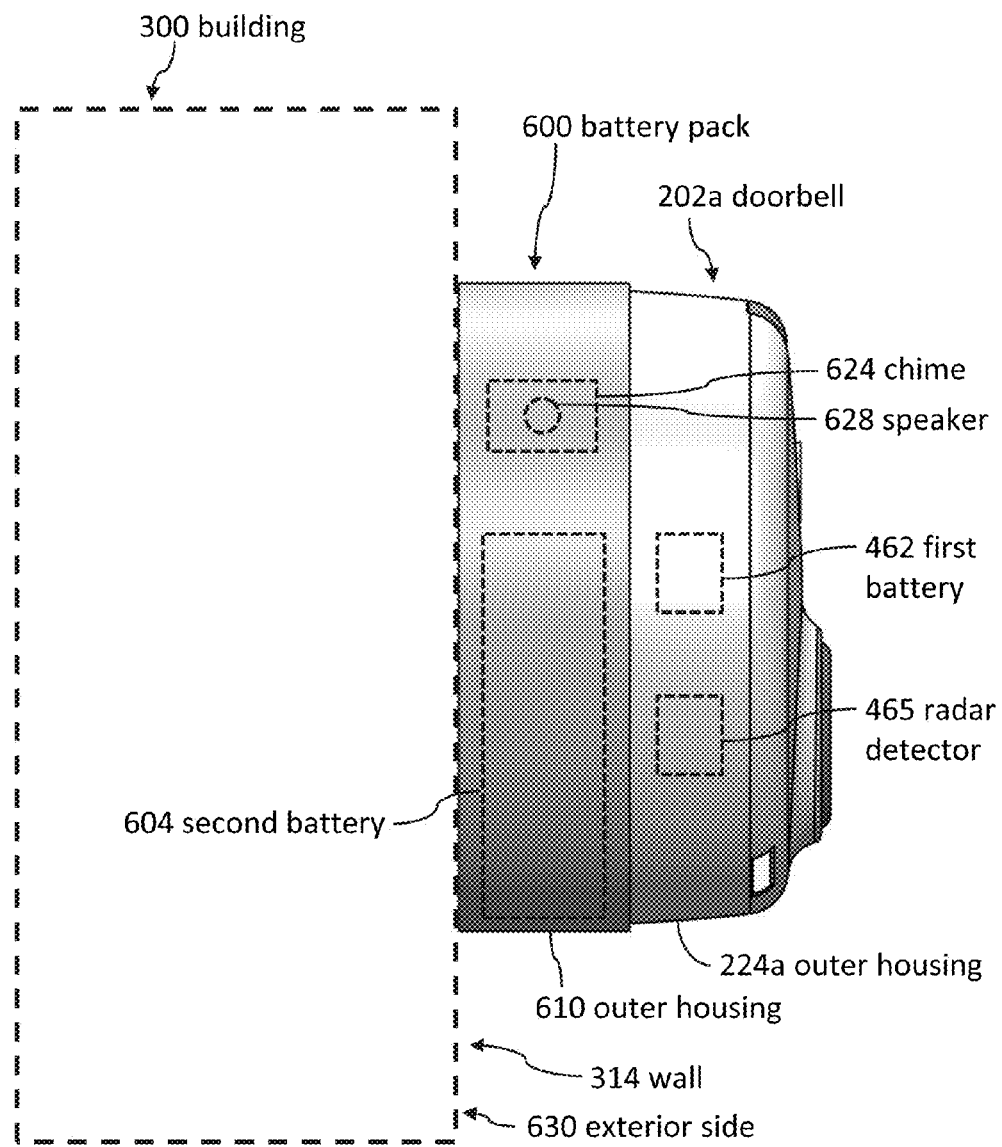

In many embodiments, doorbells 202 are electrically coupled to a power supply 312 of a building 300 by electrical wires 304 (as illustrated in FIG. 3). In some embodiments, doorbells 202 are not electrically coupled to a power supply 312 of a building. Thus, some embodiments benefit from an external battery pack, which can include a rechargeable battery. The external battery pack can provide electrical power to the doorbell 202 (as shown in FIGS. 17-19).

In some cases, batteries can convert or transform chemical energy into electrical energy through a chemical reaction. Electricity can be produced by a battery through a chemical reaction and, in the case of rechargeable batteries, electricity can produce a reverse chemical reaction to recharge the battery.

In many instances, the doorbell 202a can be configured to connect to the power supply 312 of a building 300 that can provide the electricity required to operate the doorbell 202, as shown in FIG. 3. However, sometimes the electrical wires 304 of a building 300 may not be present or accessible, requiring an alternate source of electricity for the doorbell 202a. In these cases, a doorbell system 200a, shown in FIG. 16, can be employed where an external battery pack 600 can be used to supply electricity to operate the doorbell 202a.

Figure 16:
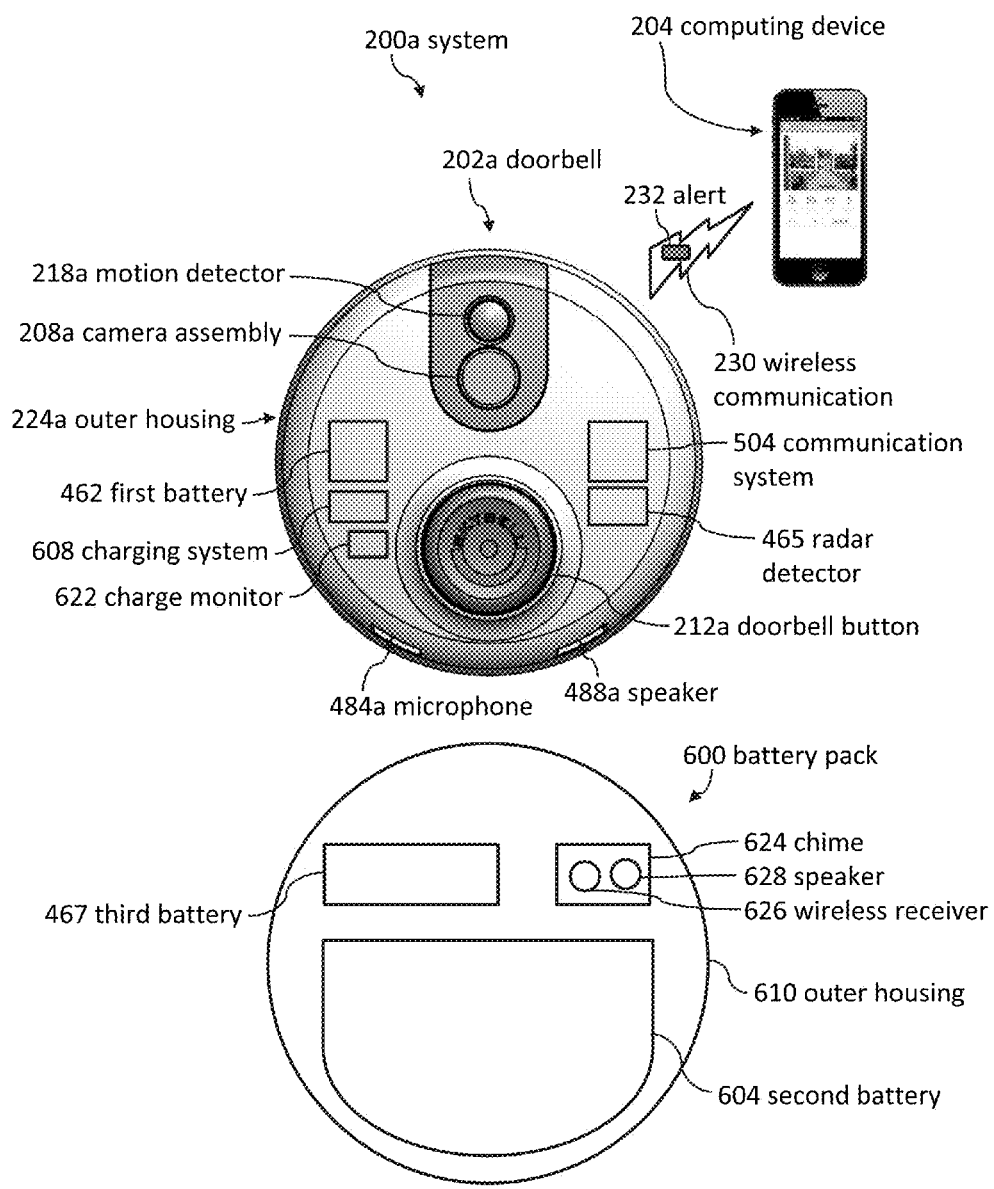
FIG. 16 illustrates a diagrammatic view of an embodiment comprising a battery pack, according to some embodiments.

FIG. 16 illustrates a diagrammatic view of a doorbell 202a and a battery pack 600. A doorbell system 200a can be configured to wirelessly communicate with a remotely located computing device 204. The doorbell system 200a can comprise a doorbell 202a, a battery pack 600, and a battery charging system 608. The doorbell 202a can comprise a camera 208a, a speaker 488a, a microphone 484a, a wireless communication system 504a, and a first battery 462. The battery pack 600 can comprise a second battery 604. The battery pack 600 can be electrically coupled to the doorbell 202a.

A battery charging system 608 can electrically couple the second battery 604 to the first battery 462. The battery charging system 608 can be configured to use the second battery 604 to recharge the first battery 462. So while that battery pack 600 can be used to supply of electricity to the doorbell 202a for general operation, the battery pack 600 can also be used to recharge the first battery 462 of the doorbell 202a.

FIGS. 17, 18, and 19 illustrate methods for electrically coupling the doorbell 202a to the battery pack 600. One method can include embodiments where the battery pack 600 and doorbell 202a are coupled by electrical wires 304 through a wall 314a of a building 300. Another approach includes embodiments that can electrically couple the battery pack 600 to the doorbell 202a using induction. Some methods include embodiments where both the battery pack 600 and doorbell 202a can be outside of the building 300 when direct wiring to a home's power supply 312 is not present or convenient.

FIG. 17 illustrates a side view of a doorbell system 200a that can use electrical wires 304 to electrically couple the doorbell 202a to the external battery pack 600 through a wall 314a of a building 300. In these embodiments, the doorbell 202a can be located on an exterior side 630b of the wall 314a, and the battery pack 600 can be located on an interior side 630a of the wall 314a. A first electrical wire 304 can electrically couple the doorbell 202a to the battery pack 600 and can enable the second battery 604 to recharge the first battery 462.

The second battery 604 can be electrically coupled to the wireless communication system 504, shown in FIG. 16, via the first battery 462. The second battery 604 can supply electricity to the wireless communication system 504 through the wall 314a from inside the building 300. The wireless communication system 504 can send a wireless alert 232, shown in FIG. 1, from outside the building 300 to the remotely located computing device 204. In some embodiments, the battery pack 600 includes a wireless communication system 504 (e.g., including an antenna) to send the wireless alert 232 from inside the building 300 (rather than from the doorbell 202a located outside the building 300).

The doorbell system 200a (shown in FIG. 16) can further comprise a battery charge monitor 622. The battery charge monitor 622 can be configured to evaluate a battery charge level of the first battery 462. The doorbell system 200a can be configured to recharge the first battery 462 from the second battery 604 in response to the battery charge level being below a threshold.

The doorbell system 200a can also comprise a second electrical wire 644 (shown in FIG. 18) that can electrically couple the battery pack 600 to a power outlet 620 of the building 300, such that the doorbell system 200a can be configured to recharge the second battery 604 with electricity from the power outlet 620. In the embodiments where the battery pack 600 is coupled to the doorbell 202a through electrical wires 304, the power outlet 620 can be used to recharge the second battery 604 in the battery pack 600.

When the battery charge level of the first battery 462 is depleted below a predetermined threshold, the doorbell 202a can receive electricity from the battery pack 600 through the wires 304. The battery charging system 608 can then cause the chemical reaction to recharge the first battery 462.

The first battery 462 can comprise a first capacity and the second battery 604 can comprise a second capacity. The second capacity can be at least four times greater than the first capacity.

In some embodiments of the doorbell system 200a, the wall 314a of the building 300 can comprise a hole 708 having an exterior end 642 (on the exterior side 630b of the wall 314a) an interior end 640 (on the interior side 630a of the wall 314a). The doorbell 202a can cover the exterior end 642 and the battery pack 600 can cover the interior end 640. The first electrical wire 304 can pass through at least a portion of the hole 708. In some cases, the hole 718 can be perpendicular to the wall 314a, where both the exterior end 642 and the interior end 640 of the hole 708 share the same axis or centerline. In several embodiments, the hole 708 can also be at a different, non-perpendicular angle to the exterior side 630b and/or have the electrical wires 304 follow a path between interior side 630a and the exterior side 630b of the hole 708. In this case, the interior end 640 and exterior end 642 of the hole 708 can be in different locations on the wall 314a. This can allow the battery pack 600 to be at a different site on the interior side 630a of the wall, instead of directly opposite the position of the doorbell 202a on the exterior side 642 of the wall 314a. For example, the battery pack 600 can be at a position on the interior side 630a of wall 314a that is close to a power outlet 620, while the doorbell 202a can be in a traditional location next to a door 254 (shown in FIG. 3).

Referring now to FIGS. 16 and 17, the battery pack 600 of the doorbell 202a can comprise a chime 624 that can be configured to emit a sound 496 (shown in FIG. 5) in response to a visitor pressing a button 212a of the doorbell 202a. The chime 624 can comprise a speaker 628 that can be configured to emit the sound 496. The doorbell 202a can further comprise sound data. The speaker 628 of the battery pack 600 can be electronically coupled, through the wall 314a, to the doorbell 202a such that the speaker 628 can be configured to emit the sound 496 based on the sound data from the doorbell 202a.

Induction can provide another method of transferring electricity to the doorbell 202a. When an alternating electrical current flows through a conductor, an electromagnetic field is produced around that conductor. If a second conductor is placed within this electromagnetic field, a current is generated in the second conductor by the electromagnetic field. Electromagnetic induction occurs when the current in one conductor generates a current in the second conductor. Many devices that utilize inductive coupling use induction coils, or a conductive wire wrapped around a core. An induction coil can be wired in series to a battery. The battery can then send an electrical current through the conductive wire in the induction coil, producing an electromagnetic field that surrounds the induction coil. When a second induction coil is placed within this electromagnetic field, a current is generated in the second induction coil.

FIG. 18 illustrates a side view of a doorbell system 200a that can employ induction coils 640, 642 to transfer electricity from a battery pack 600 to the doorbell 202a. In this embodiment, the doorbell 202a does not need to be physically coupled to the battery pack 600 by wires. Instead, they are electrically coupled by the electromagnetic field.

Referring to FIGS. 16 and 18, the doorbell 202a can comprise a receiver induction coil 640. The battery pack can comprise a sender induction coil 642. The receiver induction coil 640 and the sender induction coil 642 can be configured to enable transmitting electricity from the second battery 604 through the wall to the first battery 462. The battery pack 600 and doorbell 202a can be at different locations on the wall 314a of the building 300, as long as the receiver induction coil 640 is located within the electromagnetic field generated by the sender induction coil 642.

The doorbell 202a can be located on an exterior side 630b of the wall 314a of the building 300. The battery pack can be located on an interior side 630a of the wall 314a. The doorbell 202a can be inductively coupled to the battery pack 600 to supply electricity to the doorbell 202a and enable the second battery 604 to recharge the first battery 462 (shown in FIG. 16).

The doorbell system 200a can comprise a battery charge monitor 622 that can be configured to evaluate a battery charge level of the first battery 462. The doorbell system 200a can be configured to inductively recharge the first battery 462 from the second battery 604 in response to the battery charge level being below a threshold.

The first battery 462 can comprise a first capacity and the second battery 604 can comprise a second capacity. The second capacity can be at least four times greater than the first capacity. This larger capacity enables the first battery 462 to be relatively small, which enables the doorbell 202a to be smaller than would otherwise be practical.

The doorbell system 200a can further comprise an electrical wire 644 that can electrically couple the battery pack 600 to a power outlet 620. The doorbell system can be configured to recharge the second battery 604 with electricity from the power outlet 620.

In some embodiments, the battery pack 600 can comprise a chime 624 that can be configured to emit a sound 496 (shown in FIG. 4) in response to a visitor pressing a button 212a of the doorbell 202a. The doorbell 202a can comprise sound data. The chime 624 can comprise a speaker 628 and a wireless receiver 626 that can be configured to wirelessly receive the sound data from the doorbell 202a. The speaker 628 of the battery pack 600 can be configured to emit the sound 496 based on the sound data from the doorbell 202a.

The second battery 604 can be inductively coupled to the wireless communication system 504 via the first battery 462. The second battery 604 can supply electricity to the wireless communication system 504 through the wall 314a from inside the building 300 while the wireless communication system 504 can send a wireless alert 232, from outside the building 300, to the remotely located computing device 204.

In some embodiments, both the battery pack 600 and doorbell 202a can be located outside of the building 300, instead of the doorbell 202a being located outside of the building 300 and the battery pack 600 being located inside the building 300. FIG. 19 illustrates a side view of this type of embodiment.

Referring now to FIGS. 16 and 19, the doorbell 202a can comprise a first outer housing 224a. The battery pack 600 can comprise a second outer housing 610. The second outer housing 610 can be mechanically coupled to the wall 314a such that at least a majority of the battery pack 600 can be located between the doorbell 202a and the wall 314. The doorbell 202a can be mechanically coupled to the second outer housing 610 of the battery pack, such that the battery pack 600 can mount the doorbell 202a to the wall 314. The second battery 604 can be located outside of the doorbell 202a.

Figure 20:
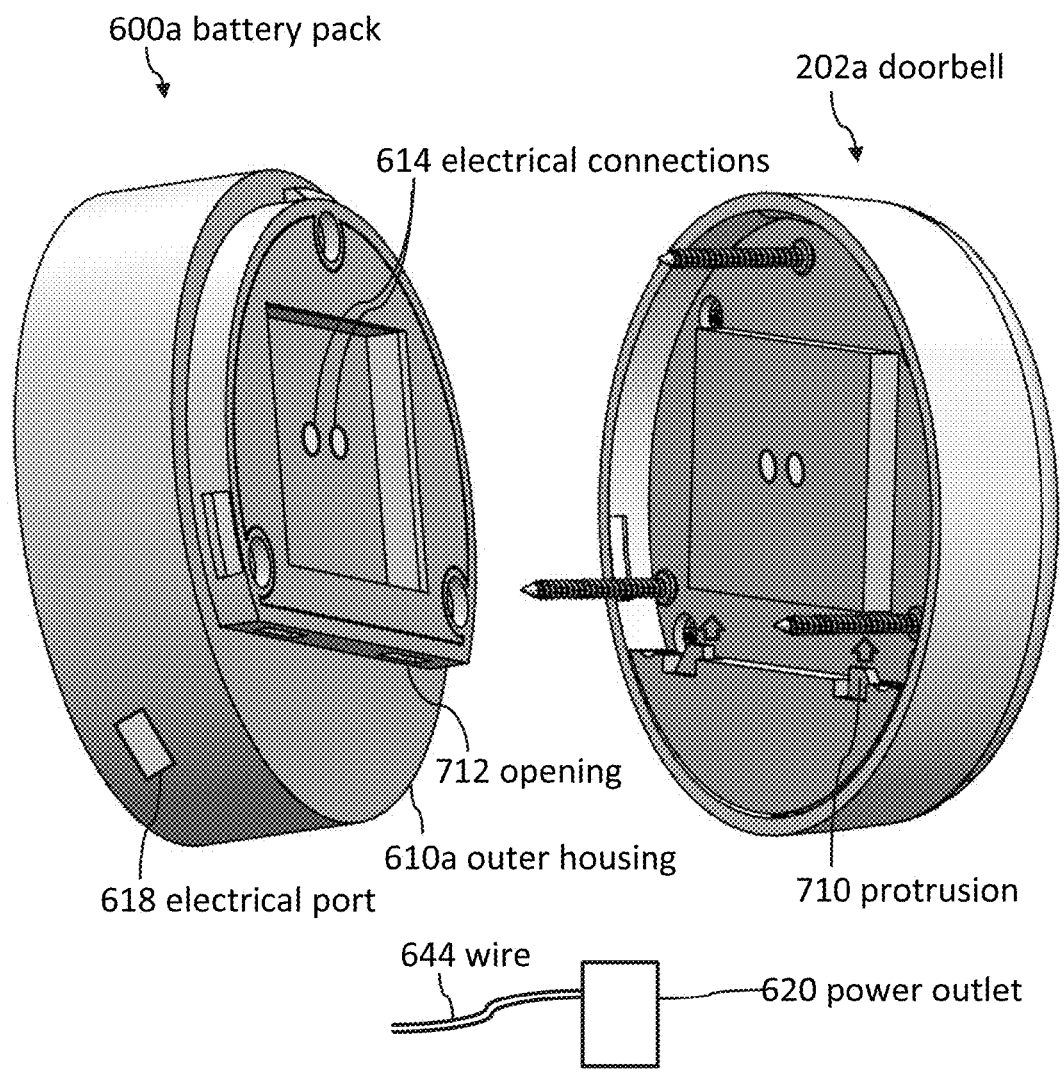
FIG. 20 illustrates a perspective view of hardware configured to couple a battery pack to the back of a doorbell, according to some embodiments.

FIG. 20 illustrates a perspective view of hardware configured to couple a battery pack to the back of a doorbell, according to some embodiments. The doorbell system 200a can further comprise electrical connections 614 that electrically couple the doorbell 202a to the battery pack 600. The battery pack 600 can comprise an electrical port 618 that can be configured to couple with an electrical wire 304 (shown in FIG. 17). The electrical wire 304 can be used to recharge the second battery 604 from a power outlet 620.

Referring now to FIGS. 16, 19, and 20, the second battery 620 can be electrically coupled to the wireless communication system 504 via the first battery 462. The second battery 604 can supply electricity to the wireless communication system 504 while the wireless communication system 604 can send a wireless alert 232, from outside the building 300, to the remotely located computing device 204.

The doorbell system 200a can comprise a battery charge monitor 622 that can be configured to evaluate a battery charge level of the first battery 462. The doorbell system 200a can be configured to recharge the first battery 462 from the second battery 604 in response to the battery charge level being below a threshold. The first battery 462 can comprise a first capacity, the second battery 604 can comprise a second capacity. The second capacity can be at least four times greater than the first capacity.

The battery pack 600 can comprise a chime 624. The chime 624 can be configured to emit a sound 496 (shown in FIG. 4) in response to a visitor pressing a button 212a of the doorbell 202a.

Although FIG. 19 illustrates a doorbell 202a that can be mechanically coupled to the battery pack 600, where the battery pack 600 is located directly between the wall 314 and the doorbell 202a, in some embodiments, the battery pack 600 is not necessarily between the doorbell 202a and the wall 314. In some embodiments of the doorbell system 200a, the doorbell 202a can comprise a first outer housing 224a. The battery pack 600 can comprise a second outer housing 610. The first outer housing 224a and the second outer housing 610 can be mechanically coupled to the wall 314. The second battery 604 can be located outside of the doorbell 202a. For example, the doorbell 202a can be coupled to a wall 314 on the outside of the building 300. The battery pack 600 can be located below, above, or to the side of the doorbell 202a. The battery pack 600 can also be coupled to the wall 314 at a different location on the outside of the building 300. In this embodiment type, the doorbell 202a and the battery pack 600 can be electrically coupled either through wires 304 located inside or behind the wall 314 of the building 300, or through wires 304 located outside of the wall 314 of the building 300. The doorbell 202a and the battery pack 600 can also be electrically coupled through induction methods where the doorbell 202a is located inside of the electromagnetic field of the battery pack 600, yet both are located outside of the building 300.

Referring now to FIGS. 16, 19, and 20, the second battery 604 can be electrically coupled to the wireless communication system 504 via the first battery 462 such that the second battery 604 can supply electricity to the wireless communication system 504. This can enable the wireless communication system to send a wireless alert 232 to the remotely located computing device 204.

In several embodiments, the doorbell 202a can be mechanically coupled to the second outer housing 610 of the battery pack 600. The doorbell system 200a can further comprise a battery charge monitor 622. The battery charge monitor 622 can be configured to evaluate a battery charge level of the first battery 462. The doorbell system 200a can be configured to recharge the first battery 462 from the second battery 604 in response to the battery charge level being below a threshold. The first battery 462 can comprise a first capacity. The second battery 604 can comprise a second capacity. The second capacity can be at least four times greater than the first capacity. The battery pack 600 can comprise a chime 624. The chime 624 can be configured to emit a sound 496 (shown in FIG. 4) in response to a visitor pressing a button 212a of the doorbell 202a.

Referring now to FIG. 16, the second battery 604 can be removable. The first battery 462 can remain inside the doorbell 202a while the second battery 604 is removed from the battery pack 600 and recharged. During this time, the first battery 462 can provide sufficient power to the doorbell 202a.

In some embodiments, when the second battery 604 is removed (e.g., for recharging), the system 200a can provide a reduced function set (e.g., a lower-power mode) to enable the first battery 462 to provide sufficient power for the function set and to provide power for a sufficient time (e.g., until the second battery 604 is recharged and/or electrically coupled to the battery pack 600). The low-power mode can disable the camera such that the camera is not configured to record an image and/or can turn off wireless communication (e.g., via the communication system 504) while maintaining the functionality of the button 212a such that pressing the button 212 causes the chime 624 to emit a notification sound.

Several embodiments include a third battery 467 that is electrically coupled and mechanically coupled to the battery pack 600. The third battery 467 can provide power to the doorbell 202a (e.g., to the first battery 462) while the second battery 604 is removed from the battery pack 600 for recharging. The third battery 467 can provide power to the doorbell via any of the manners described in the context of FIGS. 16-20. While the third battery 467 provides electrical power to the doorbell 202a, the doorbell 202a may have a reduced function set (as described above) until the second battery 604 is electrically coupled to the battery pack 600.

In several embodiments, the battery pack 600 further comprises a third battery 467 electrically coupled to the doorbell 202a. The second battery 604 can provide a first electricity to the doorbell 202a. The third battery 467 can be configured to provide a second electricity to the doorbell 202a while the second battery 604 is removed from the battery pack 600 (e.g., to recharge the battery 604) such that the doorbell 202a is configured to provide fewer functions (e.g., wireless communication, alerts, video recording) in response to the second electricity than in response to the first electricity.

Radar Detection

FIG. 16 illustrates a doorbell 202a having a camera assembly 208a and a motion detector 218a, which can be a passive infrared ("PIR") motion detector. The doorbell can also include a radar detector 465. The radar detector 465 can be an X-band radar detector. X band is a segment of the microwave region of the electromagnetic spectrum. The frequency range can be set between 7.0 to 12.0 GHz. Some embodiments include other types of radar detectors.

The performance of PIR detectors can be impeded by direct sunlight. Although inexpensive, PIR detectors do not always reliably sensor motion (e.g., of a visitor approaching the doorbell 202a).

Radar detectors can be extremely sensitive, and can even be used to detect whether a moving object is breathing (and thus is likely to be a visitor rather than a passing car). Radar detectors can also sense movement through walls. As a result, the radar detector 465 can be embedded within the outer housing 224a of the doorbell 202a while being enclosed by an opaque material (e.g., the plastic or metal of the outer housing 224a). In contrast, in many embodiments, PIR detectors are located under a translucent light filter (as described in applications incorporated by reference).

Some methods include detecting a visitor (e.g., by the motion detector 218a or the radar detector 465) and then waiting a predetermined time (e.g., at least five seconds, at least ten seconds) to differentiate non-visitor movement (e.g., people walking on the sidewalk, passing cars) from visitor movement (e.g., a person approaching a door). If movement is detected after the predetermined time, then the system 200a can send an alert 232 to the computing device 204. Thus, the method can include a first detection, a waiting period, and a second detection.

One shortcoming of waiting methods is that the visitor might stop moving (e.g., while standing just outside the door). Using the camera (and image analysis) to detect the visitor can solve this problem because the system 200a can analyze a picture taken by the camera assembly 208a to determine if a visitor is present (in the picture) even if the visitor is not moving. In other words, image analysis is not motion dependent.

Thus, combining motion detection with camera detection can dramatically increase the reliability of visitor detector (e.g., prior to the visitor pressing the doorbell button 212a). Some embodiments include detecting a first motion (e.g., by at least one of the motion detector 218a and the radar detector 465); taking a picture (e.g., by the camera assembly 208a) in response to detecting the first motion; analyzing (e.g., by the system 200a) the picture to determine if a visitor is present; and/or sending an alert to the computing device 204 in response to determining that the visitor is present.

The entire contents of the following application are incorporated by reference herein: U.S. Nonprovisional patent application Ser. No. 14/714,577; filed May 18, 2015; and entitled MONITORING SYSTEMS AND METHODS. application Ser. No. 14/714,577 includes pool monitoring systems. The radar detector 465 can be added to all of the embodiments of application Ser. No. 14/714,577. For example, the radar detector 465 can be used for pool monitoring. The radar detector 465 can detect waves indicative of a person falling into a pool of water.

Interpretation

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments can include A, B, and C. The term "and/or" is used to avoid unnecessary redundancy.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

The following is claimed:

1. A doorbell system configured to wirelessly communicate with a remotely located computing device and configured to be coupled to a wall of a building, the doorbell system comprising:
    a doorbell comprising a camera, a speaker, a microphone, a first battery, and a wireless communication system; and
    a battery pack comprising a second battery electrically coupled to the doorbell whereby the second battery provides a first electricity to the doorbell and a third battery electrically coupled to the doorbell whereby the third battery provides a second electricity to the doorbell, the battery pack configured to be electrically and mechanically coupled to the doorbell, the battery pack configured to be mechanically coupled directly to the wall and thereby couple the doorbell to the wall, the battery pack located on an exterior side of the wall such that the battery pack is located between the doorbell and the exterior side of the wall, wherein the third battery is configured to provide the second electricity to the doorbell while the second battery is removed from the battery pack such that the doorbell provides fewer functions in response to the second electricity than in response to the first electricity, and wherein the first battery comprises a first capacity, the second battery comprises a second capacity, and the second capacity is at least four times greater than the first capacity.

2. The doorbell system of claim 1, wherein when the battery pack is coupled to the wall and the doorbell is coupled to the battery pack, the doorbell does not physically contact the exterior side of the wall.

3. The doorbell system of claim 1, further comprising a chime located within the battery pack, wherein the chime is configured to emit a sound in response to a visitor pressing a button of the doorbell.

4. The doorbell system of claim 1, wherein the battery pack is electrically coupled to a power supply of the building.

5. The doorbell system of claim 1, wherein the doorbell comprises a receiver induction coil, and the battery pack comprises a sender induction coil, wherein the receiver induction coil and the sender induction coil are configured to enable transmitting electricity from the battery pack to the doorbell.

6. The doorbell system of claim 1, further comprising a battery charge monitor configured to evaluate a charge level of the battery pack.

7. The doorbell system of claim 1, wherein the battery pack comprises an electrical port configured to couple with an electrical wire to recharge the second battery from a power outlet.

8. The doorbell system of claim 7, further comprising the electrical wire that electrically couples the battery pack to the power outlet such that the doorbell system is configured to recharge the battery pack with electricity from the power outlet.

9. The doorbell system of claim 8, further comprising a battery charge monitor configured to evaluate a battery charge level of the battery pack, wherein the doorbell system is configured to recharge the battery pack in response to the battery charge level being below a threshold.

10. The doorbell system of claim 1, wherein the doorbell comprises a first outer housing and the battery pack comprises a second outer housing, wherein the second outer housing is mechanically coupled to the wall such that at least a majority of the battery pack is located between the doorbell and the wall.

11. The doorbell system of claim 10, wherein the doorbell is mechanically coupled to the second outer housing of the battery pack such that the battery pack mounts the doorbell to the wall.

12. The doorbell system of claim 1, further comprising a battery charging system.

13. The doorbell system of claim 12, wherein the battery charging system electrically couples the first battery to the second battery.

14. The doorbell system of claim 13, wherein the battery charging system uses the second battery to recharge the first battery.

15. A doorbell system configured to wirelessly communicate with a remotely located computing device and configured to be coupled to a wall of a building, the doorbell system comprising:
- a doorbell comprising a camera, a speaker, a microphone, a first battery, a wireless communication system, and at least two electrical connections;
- a battery pack comprising a second battery configured to provide a first electricity to the doorbell, the battery pack configured to be electrically and mechanically coupled to the doorbell, the battery pack configured to be mechanically coupled directly to the wall and located on an exterior side of the wall such that the battery pack is located between the doorbell and the exterior side of the wall; and
- a battery charging system that electrically couples the first battery to the second battery, wherein the battery charging system uses the second battery to recharge the first battery,
- wherein the electrical connections are configured to receive electrical wires from the building to thereby power the doorbell system, and when the doorbell is coupled to the battery pack, the electrical connections automatically electrically couple to mating electrical connections of the battery pack, and
- wherein the first battery comprises a first capacity, the second battery comprises a second capacity, and the second capacity is at least four times greater than the first capacity, and wherein the battery pack further comprises a third battery electrically coupled to the doorbell, the third battery configured to provide a second electricity to the doorbell while the second battery is removed from the battery pack such that the doorbell provides fewer functions in response to the second electricity than in response to the first electricity.

16. The doorbell system of claim 15, wherein when the battery pack is coupled to the wall and the doorbell is mechanically coupled to the battery pack, the mating electrical connections of the battery pack face away from the wall and the electrical connections of the doorbell face the wall.

17. The doorbell system of claim 15, wherein the battery pack is configured to couple the doorbell to the wall.

18. The doorbell system of claim 17, wherein when the battery pack is coupled to the wall and the doorbell is coupled to the battery pack, the doorbell does not physically contact an exterior side of the wall.

19. The doorbell system of claim 18, wherein the battery pack defines a first footprint and the doorbell defines a second footprint, and wherein the first footprint is larger than the second footprint.

20. The doorbell system of claim 15, further comprising a radar detector.

21. The doorbell system of claim 20, wherein the radar detector comprises an X-band radar detector located within an interior portion of the doorbell.

22. The doorbell system of claim 15, further comprising a bracket system configured to securely couple the doorbell to the wall.

23. The doorbell system of claim 22, further comprising a lock that secures a first portion of the bracket system to a second portion of the bracket system, wherein unlocking the lock facilitates removing the doorbell from the wall.

24. The doorbell system of claim 23, further comprising a key configured to engage the lock and move the lock between an unlocked position and a locked position.

* * * * *